(12) United States Patent
Ron et al.

(10) Patent No.: US 11,620,822 B1
(45) Date of Patent: Apr. 4, 2023

(54) RESOLVING EVENTS IN ITEM-IDENTIFYING CARTS

(71) Applicant: Amazon Technologies, Inc., Seattle, WA (US)

(72) Inventors: Daniel Ron, Somerville, MA (US);
Ejaz Ahmed, Marlborough, MA (US);
Oded Maron, Sudbury, MA (US);
Shamil Abzalov, Maynard, MA (US);
Michael Derryberry, Nashua, NH (US)

(73) Assignee: Amazon Technologies, Inc., Seattle, WA (US)

( * ) Notice: Subject to any disclaimer, the term of this patent is extended or adjusted under 35 U.S.C. 154(b) by 401 days.

(21) Appl. No.: 17/002,403

(22) Filed: Aug. 25, 2020

(51) Int. Cl.
| | |
|---|---|
| *G06V 20/20* | (2022.01) |
| *G06Q 50/28* | (2012.01) |
| *G06N 20/00* | (2019.01) |
| *G06N 5/04* | (2023.01) |
| *G06T 7/70* | (2017.01) |
| *H04N 5/225* | (2006.01) |
| *G06F 3/0484* | (2022.01) |
| *G06Q 30/0601* | (2023.01) |

(52) U.S. Cl.
CPC .............. *G06V 20/20* (2022.01); *G06N 5/04* (2013.01); *G06N 20/00* (2019.01); *G06Q 50/28* (2013.01); *G06T 7/70* (2017.01); *H04N 5/2253* (2013.01); *G06F 3/0484* (2013.01); *G06Q 30/0633* (2013.01); *G06T 2200/24* (2013.01)

(58) Field of Classification Search
CPC ....... G06V 20/20; G06T 7/70; G06T 2200/24; G06N 20/00; G06N 5/04; G06Q 50/28; G06Q 30/0633; H04N 5/2253; G06F 3/0484

See application file for complete search history.

(56) References Cited

U.S. PATENT DOCUMENTS

| | | | |
|---|---|---|---|
| 8,146,811 B2 * | 4/2012 | Kundu ...................... | G06T 7/74 382/209 |
| 8,430,312 B2 * | 4/2013 | Kundu ..................... | A47F 9/045 382/209 |
| 8,949,889 B1 * | 2/2015 | Erdmann .......... | H04N 21/25883 725/35 |
| 9,117,106 B2 | 8/2015 | Dedeoglu et al. | |
| 9,171,278 B1 * | 10/2015 | Kong ..................... | B65G 1/137 |
| 9,235,928 B2 | 1/2016 | Medioni et al. | |
| 9,473,747 B2 | 10/2016 | Kobres et al. | |
| 9,505,554 B1 * | 11/2016 | Kong ..................... | G06V 10/25 |
| 10,127,438 B1 | 11/2018 | Fisher et al. | |
| 10,133,933 B1 | 11/2018 | Fisher et al. | |
| 10,452,924 B2 * | 10/2019 | Adato .................. | G07G 1/0036 |

(Continued)

*Primary Examiner* — Manav Seth
(74) *Attorney, Agent, or Firm* — Lee & Hayes, P.C.

(57) ABSTRACT

This disclosure is directed to item-identifying carts that may generate and store image data of items being placed into, or removed from, the carts in the event that a cart is unable to recognize an item. For example, the cart may analyze frames of generated image data, representing item(s) being placed into or removed from the cart, to determine which one or more frames to store. If the cart is later unable to identify such an item, the cart may retrieve one or more of the stored frames, generate a user interface (UI) that includes these frame(s) and a request that a user operating the cart to help identify the item, and present the UI on a display of the cart.

20 Claims, 22 Drawing Sheets

(56) References Cited

U.S. PATENT DOCUMENTS

| | | | | |
|---|---|---|---|---|
| 10,521,646 B2* | 12/2019 | Adato | ............... | G08B 21/18 |
| 10,558,843 B2* | 2/2020 | Adato | ............... | G06F 16/90335 |
| 10,628,660 B2* | 4/2020 | Adato | ............... | H04N 5/23229 |
| 10,643,060 B2* | 5/2020 | Adato | ............... | H04N 5/232 |
| 11,064,821 B2* | 7/2021 | Cohn | ............... | B62B 3/1416 |
| 11,106,941 B2* | 8/2021 | Buibas | ............... | G01S 15/88 |
| 11,257,049 B1* | 2/2022 | Durazo Almeida | . | G06V 30/413 |
| 11,361,278 B2* | 6/2022 | Dattamajumdar | ... | G06Q 10/087 |
| 11,365,068 B2* | 6/2022 | Wertenberger | ........ | B25J 9/1697 |
| 11,481,918 B1* | 10/2022 | Ebrahimi Afrouzi | ..... | G06T 7/13 |
| 11,498,776 B1* | 11/2022 | Sikka | ............... | G06N 5/048 |
| 11,501,613 B2* | 11/2022 | Bronicki | ............... | G06V 40/172 |
| 2013/0284806 A1 | 10/2013 | Margalit | | |
| 2015/0029339 A1* | 1/2015 | Kobres | ............... | H04N 7/181 |
| | | | | 348/150 |
| 2019/0149725 A1* | 5/2019 | Adato | ............... | G06V 20/17 |
| | | | | 348/158 |

* cited by examiner

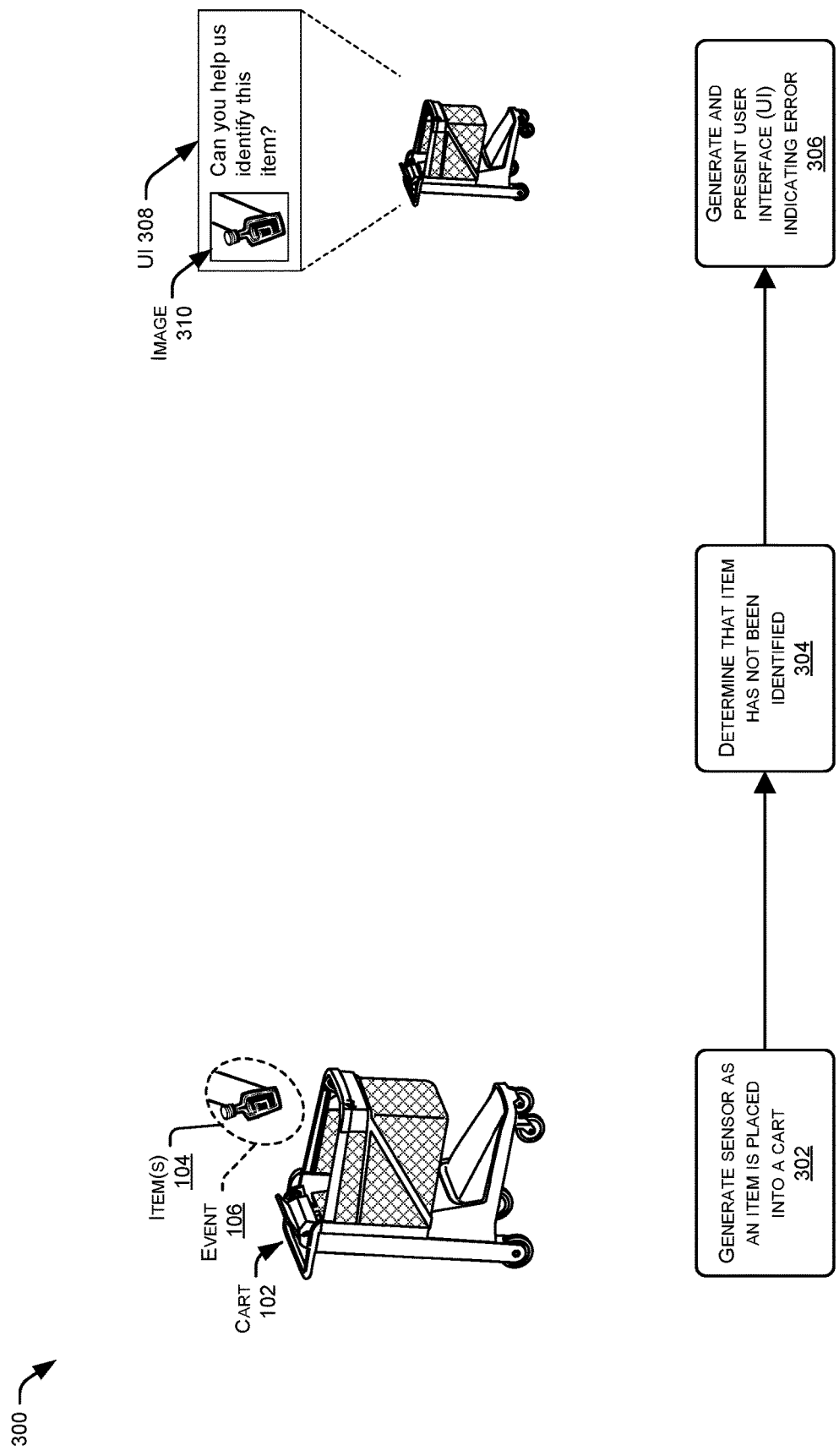

RESOLVING EVENTS IN ITEM-IDENTIFYING CARTS

BACKGROUND

Materials handling facilities, such as warehouses or retail stores, often provide users with totes (e.g., carts, baskets, etc.) to facilitate the processes by which the users locate, identify, retrieve, and transport items at the facilities. For example, when a user identifies an item that he or she desires on a shelf or other location within a materials handling facility, the user may remove the item from the shelf or other location and place the item into a receptacle of a tote before the user continues to travel through the facility in search of additional items.

Traditionally, when the user has finished identifying and retrieving the items he or she desires, the user may transport the items in the tote to a check-out destination within the materials handling facility, such as a distribution station, a cashier, or a dedicated self-checkout stand, and transition the items to a human operator or an automated agent. Typically, the user or the human operator manually removes the items from the tote, scans or otherwise registers the items with the user, and places the items into one or more bags or other item carriers. The user may then use the bags or other item carriers to transport the items to another destination (e.g., to an automobile, workstation, or home) by manually carrying the item carriers to the other destination, or by transporting the item carriers to the destination within the tote. Therefore, traditional methods for acquiring items some materials handling facilities often require users to load items into their totes, remove the items from the tote for payment, and return the items to the totes and/or other item carriers for transporting the items to another location, such as the users' automobiles or homes.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example sequence of operations in which a user again places an item into an item-identifying cart, but the cart is unable to identify the item. In response, the cart acquires one or more frames of image data generated when the user was placing the item into the cart, and generates and presents a UI that includes the frame(s) and indicates that an error has occurred.

DETAILED DESCRIPTION

Figure 1A:
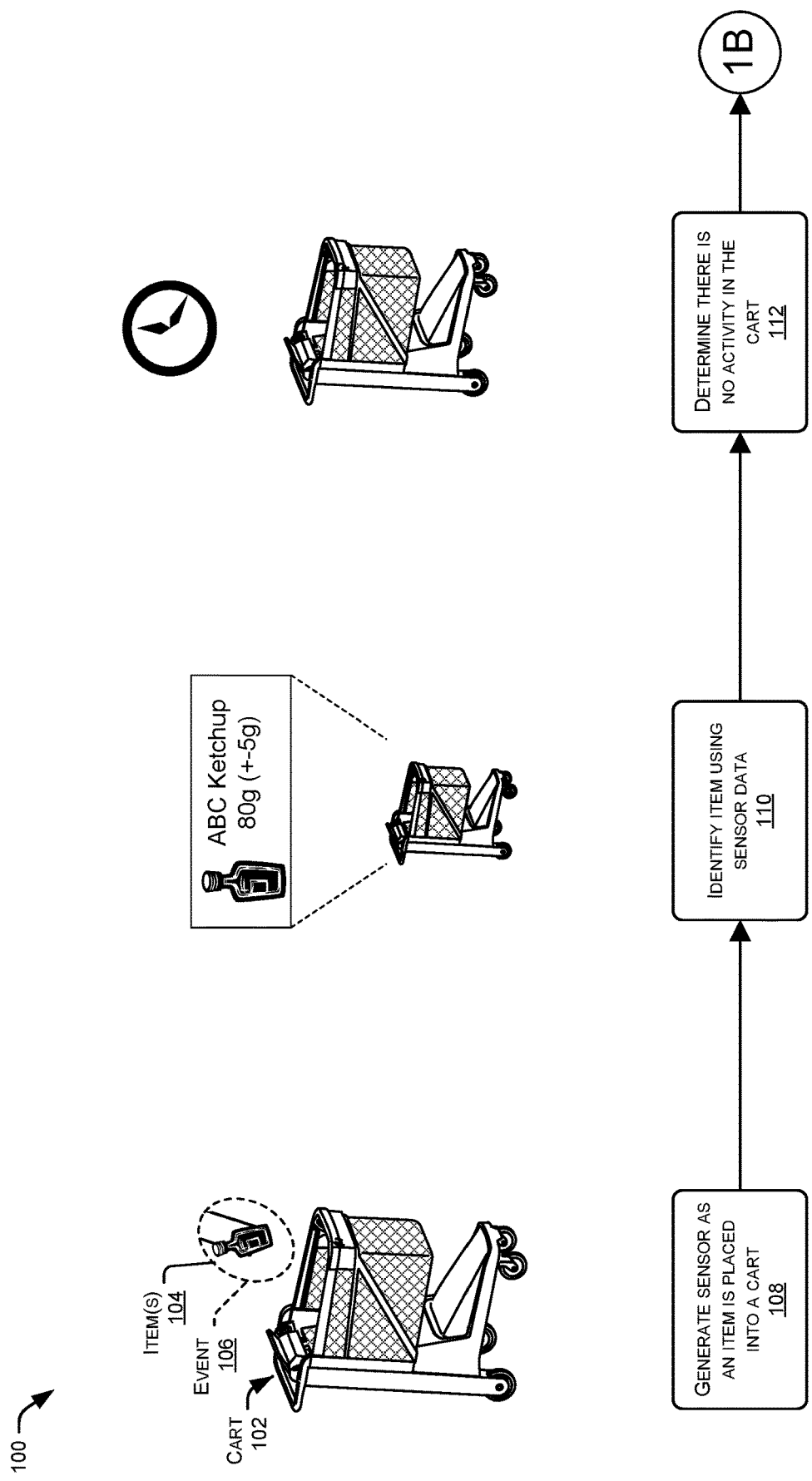
FIGS. 1A-C collectively illustrate an example sequence of operations in which a user places an item into an item-identifying cart, which identifies the item using image data generated by one or more cameras mounted to the cart. After identifying the item, the cart uses weight data generated by one or more weight sensors of the cart and a known information regarding the identified item to determine possible outcomes of an event involving the identified item, such as an action related to the item (e.g., take or return) and a quantity involved. When the cart narrows the possible outcomes to a single possible outcome, the cart updates a virtual cart associated with a user operating the cart to indicate the outcome.

This disclosure is directed to item-identifying carts that may be utilized by users in material handling facilities to automatically identify items that the users place in their carts as they move around the material handling facilities. In addition, these carts may automatically determine the outcome of respective events that occur with respect to these identified items. For example, the carts may be configured to identify one or more items that are placed into or removed from the cart, and thereafter determine one or more actions taken with respect to the identified items and a quantity of the items involved. For example, after identifying a first item and a second item either placed into or removed from the cart, the cart may determine that the user added two instances of the first item and removed one instance of the second item. In response to making this determination, the cart may update a virtual cart of a user operating the physical cart to indicate an addition of two instances of the first item and to remove an instance of the second item from the virtual cart.

In addition, the item-identifying carts described herein may generate and store image data of items being placed into, or removed from, the carts in the event that a cart is unable to recognize an item. For example, the cart may analyze frames of generated image data, representing item(s) being placed into or removed from the cart, to determine which one or more frames to store. If the cart is later unable to identify such an item, the cart may retrieve one or more of the stored frames, generate a user interface (UI) that includes these frame(s) and a request that a user operating the cart to help identify the item, and present the UI on a display of the cart.

In some instances, the item-identifying cart (or "smart cart") may include one or more cameras for generating image data, which the cart may thereafter analyze to identify one or more items represented in the image data. For example, the smart cart (and/or other system(s) communicatively coupled to the cart) may include an item-identification component configured perform computer-vision techniques on the generated image data to identify the item(s). For example, the item-identification component may use a trained localizer to identify a region of the image data that includes an item and one or more trained classifiers that analyze the identified region to identify the item. For example, the trained classifier(s) may be configured to identify the item(s) by identifying text of the other, shapes or other visual indicia of the item(s), barcode(s) printed on the item(s), and/or the like. In addition, the item-identification component may additionally, or alternatively, use other sensor data for identifying the item(s), such as weight data indicating a change in weight in a basket of the cart and/or the like.

In addition to including one or more cameras for generating the image data, the cart may include one or more weight sensors to determine a weight or change in weight of a basket of the cart. For example, the basket of the cart may include one or more load cells coupled to the basket configured to determine when a weight of the basket has changed. The weight sensor(s) may be configured to output a measured change in the weight, which a weight-change component of the cart may receive and use to calculate an indication of a tolerance associated with the weight change. That is, the weight-change component may output an indication of the amount of the weight change and an indication of a range around the weight-change value within which the weight-change component is confident represents the actual weight change of the basket. For example, the weight-change component may output an indication of a weight-change value (e.g., 80 grams) and an indication that the weight-change component is confident of the reading within plus (+) or minus (−) 50 grams. Thus, in this example, the weight change of the basket can confidently be determined to be between +30 grams and +130 grams.

In some instances, the weight-change component of the cart may be configured to output a weight-change value and one of multiple predefined tolerance indications, such as +/−5,000 grams, +/−500 grams, +/−100 grams, +/−60 grams, +/−30 grams, or +/−1 gram. In this example, the weight-change component may thus output an indication of a weight change of the basket and an indication of one of the tolerances. As will be appreciated, a tolerance of +/−5,000 grams indicates that the weight-change component is not confident about the accuracy of the weight-change value, whereas a tolerance of +/−1 gram indicates that the weight-change component is very confident in the accuracy of the weight-change value.

Further, it is to be appreciated that movement of the cart may affect the accuracy of the weight-change values reported by the weight sensor(s) and, thus, may affect the tolerances output by the weight-change component. For example, when a user pushes a cart down an aisle (resulting in bumpiness of the basket and weight sensors) or leans on a basket (affecting the weight change-value determined by the weight sensors), the accuracy of the weight reading may be relatively low and, thus, the corresponding tolerance may be low as well. However, when the user ceases pushing the cart, leaning on the basket, or the like, the "noise" surrounding the weight-change reading may be significantly lessened, thus resulting in a more accurate reading—that is a weight-change reading accompanied by a relatively smaller tolerance (e.g., +/−30 grams, +/−1 gram, etc.).

In addition to the item-identification component, configured to identify items, and the weight-change component, configured to output a weight-change value and a corresponding tolerance, the cart (or other system communicatively coupled to the cart) may include an event-determination component configured to determine the outcome(s) of an event(s) involving one or more items. For example, upon receiving an indication that the item-identification component has identified an item and an indication that the weight-change component has detected a change in weight of the basket, the event-determination may attempt to determine the result of an event involving the identified item. To do so, the event-determination component may use an item identifier associated with the identified item to determine, from item-catalog data or otherwise, a weight associated with the item. For example, envision that the item-identification component has identified one can of soda. The event-determination component (or another component)

may use this item identifier to determine that the can of soda is associated with a weight of 80 grams and a tolerance of +/−5 grams—meaning that a typical can of this soda will weigh between 75 and 85 grams.

After determining the weight of the identified item, the event-determination component may generate possible outcomes involving the item. For example, the event-determination component may determine the expected change in weight of the basket if two instances of the can of soda were removed from the basket (an expected weight change of −170 to −150 grams), the expected change in weight if one instance of the can of soda was removed (an expected weight change of −85 to −75 grams), the expected weight change if the user did not add or remove the can of soda (0 grams), the expected weight change if the user added one can of soda (an expected weight change of +75 to +85 grams), and the expected weight change if the user added two instances of the can of soda (an expected weight change of +150 to +170 grams). As will be appreciated, the event-determination may make these determinations for a predefined amount of combinations of possible outcomes, such as all combinations between removing five instances of an identified item and adding five instances of an identified item or the like.

After determining the possible outcomes involving the identified item, the event-determination may use the weight-change value and associated tolerance to determine a weight range. For example, envision that the event-determination component receives, from the weight-change component, an indication that the weight of the basket has increased by 84 grams and that weight-change component is confident in this reading to plus (+) or minus (−) 100 grams. The event-determination component may use this data to generate a range indicative of the real-world change in weight that the basket may have experienced. In this example, the event-determination component calculates a range of between −16 grams (84 grams less 100 grams) and 184 grams (84 grams plus 100 grams).

After generating this weight range, the event-determination component determines whether any of the generated possible outcomes could explain the change in weight corresponding to the weight range. For example, the event-determination component may determine whether respective ranges of the generated possible outcomes at least partly fall within the weight range. In this example, the event-determination component may determine that three possible outcomes are associated with ranges that at least partly fall within the weight range of −16 grams to +184 grams. That is, the event-determination component determines that zero (0) additions of the can of soda to the cart falls within the range (and, thus, may explain the change in weight), as does one addition of the can of soda (associated with a range of +75 to +85 grams) and two additions of the can of soda (associated with a range of +150 to +170). Given that three possible outcomes explain the determined change in weight, and given that the tolerance associated with the weight reading (+/−100 grams) is not the most confident tolerance, the event-determination component may await further weight-change data before determining the outcome of the event. In addition, the weight-change component may only operate on weight-change data that is associated with tolerance values that are at least as confident as the confidence of the already received tolerance. That is, the event-determination component may disregard weight-change values associate with tolerances that are greater than +/−100 grams, while utilizing readings associated with tolerances that are +/−100 grams or smaller.

Thus, envision that the weight-change component outputs an indication of a weight-change of +81 grams with a tolerance of +/−30 grams. In response to receiving this information, the event-determination component may generate a weight range of +51 to +111 grams. Again, the event-determination component may determine whether any of the three determined possible outcomes can explain this weight reading. In this example, only one outcome is associated with a range that at least partly falls within the determined weight range. Here, the event-determination component determines that the range associated with the addition of one instance of the can of soda to the basket (+75 to +85) is the only range of the possible three outcomes determined from above to fall within the newly determined weight range (+51 to +111 grams). Thus, in response to determining that a single possible outcome explains the weight-change reading, the event-determination component may store data indicating the result of the event, which may be used to update the contents of a virtual cart of the user. For instance, in this example, this data may be used to update a virtual cart of the user to indicate addition of one can of soda. Thus, a display or the cart or other output device may present an indication to the user that one can of soda has been added to their cart.

While the above example describes determining that the single possible outcome represents the result of the event involving the identified item after determining a single time that it represents the only possible outcome, in other instances the event-determination component may verify this determination a threshold number of times (e.g., two, three, five, etc.) prior to storing an indication that it represents the outcome of the event. Further, and as noted above, in some instances, the event-determination component may determine that multiple possible outcomes explain the determined weight range. As described above, in instances where the weight range is not associated with a smallest tolerance, the weight-change component may await additional weight-change readings before associated a result with the event involving the identified item. In instances where the weight-change reading is associated with a smallest tolerance (e.g., +/−1 gram), however, the event-determination component may determine which of the multiple possible events that can explain the weight-change reading is most likely. In some instances, this determination may be based on one or more predefined assumptions, such that a user is more likely to add one instance of one item than add three instances of the item and remove two instances of another item, and so forth.

In still other instances, the event-determination component may determine that no possible outcomes explain the weight range. That is, the event-determination may determine that none of the ranges associated with the possible outcomes falls within the determined weight range output by the weight-change component. In still other instances, the item-identification component may fail to identify the item from the image data. In each of these instances, the event-determination component may output an error indication, which a user-interface (UI) component of the cart may receive. Upon receiving the indication of the error, the UI component may generate an UI indicating the error to the user and, in some instances, including image data associated with the item and a request that the user help aid in the identification of the item and/or the result of the event. For example, if the item has been identified but the event-determination component has been unable to determine what action the user took with respect to the item, the UI component may generate a UI that includes an image of the item from item-catalog data and selectable icons to indicate what action the user took with respect to the item (e.g., added to the cart, removed from the cart, a quantity involved, etc.). In instances where the item-identification component did not identify the item, the UI component may acquire image data generated by the one or more cameras of the cart depicting the item and instructions and/or selectable icons for the user to help the cart identify the item, such as re-place the item in the cart, manually enter in an identifier of the item, or the like.

In the latter instances, the UI component may select one or more frames of image data to include in the UI from multiple frames stored in memory. In order to enable this feature, the cart may include an item-localization component. The item-localization component may function to receive the image data generated by the cameras of the cart and input this image data into one or more trained localizers that have been trained to identify items from image data. If a respective frame of the image data includes an item, the localizer may output an indication of an area of the frame that represents the item and a confidence level indicating a confidence that this area includes an item.

After receiving this output from the localizer, the item-localization component may determine whether to store the frame in memory for potential later use by the UI component. For instance, the item-localization component may determine whether the frame meets one or more criteria and, if so, may store the frame in the memory. Further, in some instances the localizer may output multiple areas of the frame of the image data that includes an item. In these instances, the item-localization component may be configured to select the area associated with the highest confidence value and compare this area to the one or more criteria for determining whether to store the selected area.

In one example, the item-localization component may determine whether the confidence level associated with the identified area (e.g., bounding box) is greater than a threshold confidence (e.g., 0.5. 0.65, 0.95, etc.). If not, then the item-localization component may refrain from storing the area of the frame. If so, then the item-localization component may determine whether the area of the frame meets one or more size criteria, such as whether the area is smaller than a threshold or greater than a threshold size. If not, then the item-localization component may again refrain from storing the area of the frame. If so, however, then the item-localization component may determine whether a threshold amount of time has elapsed since the last time that the item-localization component stored a portion of a frame of image data (e.g., 1 millisecond, 10 milliseconds, 1 second, etc.). If not, then the item-localization component may refrain from storing the portion of the frame. If so, however, then the item-localization component may store the frame in the memory. In some instances, the item-localization component stores these portions of frames in volatile memory that stores, at most, a predefined number of frames (e.g., two minutes' worth of image data). In these examples, the least-recent frames may be deleted from the volatile memory as the newest frame is stored. Further, given that the item-localization component stores the frames in volatile memory, the image data stored therein may be deleted when the cart is powered off.

By storing these frames of image data in the memory, the item-localization component enables the UI component to acquire one or more of these frames when generating one of the UIs described above. For example, if the item-identification component fails to identify an item, but the weight-change component determines that a change in weight of the basket has occurred, then the event-determination component may output an indication that it has failed to determine a result of an event. In response, the UI component may determine a time range associated with this event and may select one or more frames of image data from the memory (e.g., the volatile memory) associated with this time range. For example, if the event is associated with a one-second window, the UI component may analyze the memory and select the frame (or portion of a frame) that is within this one-second window and is associated with a highest confidence level. The UI component may then use this portion of the selected frame for inclusion in the UI in hopes of aiding the ability of the user to identify the item.

In some instances, however, another item may have been accurately identified during the time window associated with the event involving the unidentified item. In these instances, the UI component may artificially lower confidence levels of frames of image data stored in the memory that are near in time to the resolved event involving the identified item. For example, if 0.4 seconds into the example one-second window an item was identified (and an event involving the item was resolved), the UI component may bias downwards the respective confidence levels associated with stored frames of image data that occur near the 0.4-second mark. By doing so, the UI component lessens the chance that, when it selects the frame having the highest confidence level in this time range, it selects a frame depicting the identified item rather than the unidentified item. In some instances, the UI component uses an exponential decay function for biasing downwards the confidence levels of the frames so as to heavily affect frames near the identified item (e.g., at the 0.4 second mark) but not frames further away (e.g., at the 0.2-second mark, the 0.6-second mark, etc.).

In addition, this disclosure is also directed to techniques for updating the item weights stored in item-catalog data. For instance, and as noted above, item-catalog data may be used to determine the weights of items, such as the example where a can of soda was determined to weigh approximately 80 grams+/−5 grams. Given that the smart carts described herein both weight and identify items, however, the smart carts may be used to make these stored values more accurate in some instances. For instance, while an item catalog may store the indication that the can of soda weighs 80 grams with a 5-gram tolerance, envision that the smart carts continually measure a weight change in the cart between 72 grams and 76 grams over time. This data may be aggregated over time and used to modify the value of the item weight of the can of soda in the item catalog. For example, using the example immediately above, the item catalog may be updated to indicate that the can of soda weighs 74 grams with a +/−4-gram tolerance, for example. Thus, the carts may be updated over time with more accurate item catalogs (and, thus, item weights), which may result in more accurate identification of items and events involving these items.

In some instances, the carts described herein may send their data to a central repository (e.g., one or more remote servers) on a periodic basis, such as once-a-day or the like. This central repository may receive this data, which may comprise event-description data, item data, weight data, and the like, from carts deployed at various facilities. The central repository may include one or more components to determine average weights, median weights, variances, and other statistical information regarding the weights of individual items. Further, if the listed weight and/or tolerance for a particular item differs by more than a threshold amount determined by the central repository, then a component of the central repository may update the item catalog to indicate the modified, more accurate weight and/or tolerance. Further, the central repository may send out this updated information to the carts on a periodic basis, in response to making a change, and/or the like. For example, the central repository may update the item catalog to indicate the particular can of soda should actually be associated with a 74 gram-weight and a +/−4-gram tolerance. In addition, the central repository may send out update catalog data once-a-day and/or at any other periodicity.

Returning now to the high-level, the smart carts described herein may both identify items and determine the outcome of events involving these items, in some instances, using generated sensor data, such as image data, weight data, and the like. In some instances, after identifying one or more items, the cart may provide feedback to a user operating the cart to indicate that one or more items have been identified. For example, upon a user placing an item into or removing an item from the cart, the cart may generate image data, identify the item, and cause one or more output devices on the cart (or otherwise) to output an indication that the item has been identified. For example, the cart may cause a lighting element on the cart to turn a predefined color (e.g., green) or to illuminate in a predefined lighting sequence. In addition, or in the alternative, the cart may cause a display located on the cart to present data identifying the item, thus indicating to the user that the cart has successfully identified the item that has been placed into or removed from the cart. In still other instances, the cart may cause one or more other displays or output devices (e.g., a mobile phone of the user) to output one or more indications, which may be audible, visual, and/or the like. In still other instances, the cart may cause one or more speakers (on the cart or otherwise) to output an audible tone or other sound indicating that the item has been identified.

Furthermore, sometime after identifying the item(s) and providing feedback to the user that the item(s) have been identified, the cart may attempt to determine the outcome(s) of event(s) involving the identified item(s), as described above. For example, after identifying an item placed into or removed from a basket of the cart, the cart may attempt to determine an action taken with respect to the item, such as whether the item placed into the cart (e.g., a "take") or whether the item was removed from the cart (e.g., a "return"). In addition, the cart may attempt to determine a quantity of the items involved, such as whether one, two, or any other number of instances was placed into the cart or removed from the cart. Furthermore, in some instances, the outcome of a particular event may involve multiple identified items and quantities. For instance, after identifying a first item and a second item, the cart may determine that two instances of the first item were added to the cart, while one instance of the second item was removed from the cart. Of course, while an example is provided, it is to be appreciated that the cart may determine any other number of items and any other quantity with respect to these identified items.

After both identifying one or more items and determine outcomes of events involving these items, the cart may provide feedback to the user operating the cart that the outcome has been determined. For example, the cart may cause the display to be updated to present data indicating the determined actions as part of a virtual cart representing a listing of items acquired by the user during a current shopping session. For instance, the display may present data updating the virtual cart of the user to indicate that two instances of the first item have been added to the cart, while one instance of the second item has been removed. Furthermore, the cart may provide other forms of visual and/or audible feedback to the user indicating that the virtual cart has been updated. Further, in instances where the cart is unable to identify the item(s) or unable to determine the outcome(s) of the event(s) involving the item(s), the cart may generate and present the UIs introduced above and described in detail below.

In some instances, the cameras of the smart carts described herein may include one or more cameras for identifying items and one or more cameras to identify the users operating the carts. Upon identifying a user operating a cart and items placed into the cart, the item-identifying cart may update a virtual shopping cart of the user to represent the items that have been placed in, or removed from, the physical cart, using the techniques introduced above and described in detail below. According to the techniques described herein, an item-identifying cart may include one or more first cameras positioned on a frame of the cart and directed substantially toward a position typically occupied by a user pushing the cart to generate first image data for identifying the user. For example, the first image data may represent an identifier associated with an account of the user displayed on a mobile device of the user (e.g., a barcode or the like displayed on a mobile phone), biometric-recognition data representing the user, gesture data representing the user, and/or the like. The cart may include components for associating the first image data with the user, or the cart may send the first image data to one or more remote servers for determining this association.

In addition, the cart may include one or more second cameras positioned on the frame of the cart to generate second image data representing items that a user places in the cart, and/or removes from the cart. The cart may include one or more components that analyze the image data to determine an item identifier for the item(s) placed in the cart, or removed from the cart, and update a virtual shopping cart for the user of the cart. Once a user has finished their shopping session, the user may be able to efficiently check-out of the materials handling facility (or "facility") without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual shopping cart of the user that were identified by the cart during the user's shopping session.

Similar to traditional carts, such as shopping carts commonly found at grocery stores or other retail establishments, the item-identifying carts described herein may include a durable frame, including or supporting a basket, made of plastic or metal (often having four sides in a quadrilateral shape), multiple wheel castors configured to allow the cart to move on a surface, and one or more handles for a user to push and/or pull the cart around in a facility. However, the carts described herein may include additional hardware and software components that configure the carts to, among other functions, identify items placed in the carts on behalf of the users, and update virtual carts of the users to automate one or more steps of a traditional shopping experience.

For example, an item-identifying cart may include one or more cameras (or other imaging sensors), memory that stores software components for identifying users and/or items and for performing other operations for managing virtual shopping carts, at least one processor to execute the software components, and at least one battery to power the components of the cart. The camera(s) may include one or more first cameras positioned on the frame toward a location where a user would typically push the cart. The one or more first cameras may generate first image data, such as image data of a mobile phone of a user representing visual indicia (e.g., a barcode) associated with an account of the user. Thus, the user may hold up his or her mobile device representing the visual indicia such that the first camera(s) may scan or otherwise generate the first image data. The cart may then identify the account of the user using the first image data or may send the image data to a remote server(s), which may identify the user account using the first image data. Thus, items placed into the cart during a shopping session of the user operating the cart may thereafter be associated with the user account.

In some instances, the smart cart may also include one or more displays, which in some instances may reside adjacent the first camera(s) such that the display is viewable by the user operating the cart. The display may present content that is customized for the user at least partly in response to the cart identifying the user via the first image data. For example, upon the cart or the remote server(s) identifying the user operating the cart, the display may present information associated with the user, such as a shopping list of the user, a name of the user, account information associated with the account of the user, and/or the like. Furthermore, in some instances the display may present location-specific information. For example, if the cart determines that it is located in a particular location of a store, such as near a produce section, the display may present information regarding the particular location, such as cost of produce items near the cart. In another example, the display may present information such as promotions occurring on items that reside adjacent the location of the cart. In some instances, the presented promotions may also be determine based on information associated with the user (e.g., a past purchase history, preferences, etc.), current contents of the cart, and/or the like. The display may also be used to present the UIs introduced above and described in detail below.

In some instances, upon the cart identifying an item using image data generated by the one or more cameras, the display may present item-identifying information (e.g., name, picture, etc.) on the display, thus providing feedback indicating that the item has been identified. However, until the cart can determine the action taken with respect to the identified item and/or the quantity involved, the display may present data indicating that the cart is still processing the event. For example, the display may present, adjacent the item-identifying information, an icon (e.g., a spinning circle, etc.) indicating that the cart is still attempting to determine the outcome of the event involving the item. Upon determining the outcome, such as the item being placed into or removed from the cart, as well as the quantity of the item involved with the take or return, the cart may cause the display to present data indicating the action and the quantity. For example, the cart may update the virtual-cart data presented on the display.

In addition to the cameras positioned towards the user operating the cart for identifying the user, the smart cart may further include one or more second cameras positioned on the frame of the cart such that an optical axis of the second camera(s) is directed towards a location where second image data generated by the second camera(s) represents or captures items that are placed in the cart, and removed from the cart, by a user. The second image data may be analyzed by the software component(s) of the cart, and/or by remote server(s), using one or more image processing techniques, such as text recognition, object recognition, and/or any other technique. The software component(s) may thus identify or determine item identifiers for the items represented in the image data.

As described below, the cart may include a frame that defines a basket to receive the items. The frame may couple to one or more weight sensors (e.g., load cells, etc.) configured to generate weight data indicative of a current weight of the basket. In some instances, upon the cart identifying an item via the image data generated by the cameras directed substantially towards the basket, the cart may determine a weight change that occurs before and after identification of the item. The cart may use this information to determine, from an item catalog, the weight of the identified item (and the weight of any other items identified in the time period between the last reported weight and the current weight) and may provide this information to an event-determination component. The event-determination component may also receive the weight-change data and information about the current contents of the user's virtual cart and may use this received data to determine an outcome of the event. After doing so, the cart may update a virtual shopping cart for the user's shopping session (e.g., add an item to a list of items to be purchased by the user, or remove an item from the list of items to be purchased). In this way, the cart may identify and track items that are retrieved from different locations within the facility and, after determining the outcomes of events associated with these items, may maintain a virtual shopping cart, or virtual list, of the items selected by the user to provide a more seamless and efficient checkout experience for the user.

In some examples, the cart may have a frame that defines a basket comprising a bottom having quadrilateral shape, one or more (e.g., four) sides protruding from the bottom to define an interior cavity, and a top having a perimeter that defines an opening to receive items placed in the interior cavity of the basket. One or more second cameras may be positioned on the basket of the cart to generate image data representing the items placed in the cart. In some examples, the cameras may be included in respective capture assemblies that include other components, such as light sources (e.g., light emitting diodes (LEDs)) to active and emit light on the items such that the items are illuminated in the image data to help improve processing of the image data to identify the items. In other instances, the cameras may reside adjacent the light sources.

Although the cameras may be positioned anywhere on the cart, in some examples, the basket of the cart may have cameras disposed proximate to each of the four corners of the perimeter of the top of the basket. In this way, the entire cart may be represented in the various field-of-views (FOVs) of the cameras, which also may not be obstructed as the basket of the cart fills up with items. The cameras may, in some examples, be internal to the basket, or otherwise define a relatively small protrusion from the form-factor of the basket, such that the carts may still be capable of "nesting" together in a line when stored at a facility, similar to traditional shopping carts.

Due to the battery life constraints of the cart, it may be advantageous to refrain from having the cameras and/or light sources operating for large periods of time to detect an image being placed in the cart. Thus, in some examples the cart may additionally include one or more proximity sensors (e.g., time-of-flight (ToF) sensors, passive infrared (PIR) sensors, etc.) that generate sensor data to detect movement of an item in, or out, of the cart while the cameras and light sources are de-activated or in a low-power state. In this way, proximity sensors, which may consume less power than the cameras and/or light sources, may detect movement proximate the cart before the cameras and/or light sources are activated.

Thus, the cart described herein may include four cameras disposed at or proximate to the four corners of the perimeter of the basket of the cart. To detect items placed in the cart, or removed from the cart, the cameras may have respective optical axes (e.g., imaginary line along which light propagates through the camera) that are oriented towards an interior of the perimeter of the top of the cart (e.g., towards the middle or centroid of the perimeter of the cart). By orienting the cameras inward with respect to the perimeter of the top of the cart, only items that pass through (e.g., in or out) of the opening of the basket may be represented in image data of the cameras.

The cameras may additionally be oriented to face in a particular vertical direction. For instance, the optical axes of the cameras may, in some examples, be directed downward towards the bottom of the basket to identify when items are placed in the bottom of the basket or taken from the bottom of the basket. For example, some of the carts described herein may include an over-the-basket structural element that couples to a left side and a right side of frame, with a middle portion of this structural element including a camera having an FOV directed substantially downwards into the basket. In addition, this over-the-basket element further include one or more light sources (e.g., LEDs) directed downwards and, in some instances, one or more lighting elements that a user or associate of the facility may selectively turn on to indicate different states of the cart, such as a state in which a user is requesting assistance, a state in which an age of the user is to be verified prior to sale of an item placed into the cart, and/or the like.

However, because users of the carts may not need to remove items from the cart to be scanned before leaving the facility, it may be advantageous for users to place one or more bags, or other item carriers, in the cart before their shopping session. In this way, users may simply retrieve items from shelves or other storage locations during their shopping session, place the items directly into their bags/item carriers, and remove the bags/item carriers from the carts once they have finished their shopping session for a more seamless shopping experience. Accordingly, the basket of the cart may be sized such that one or more bags provided by the facility, and/or by the users themselves, fit efficiently in the bottom of the basket to help maximize storage space of the interior cavity the cart. In such examples, the bags/item carriers may at least partially occlude the FOVs of the cameras such that the items are difficult or impossible to identify using image data from the cameras. Further, in some instances, one or more bag clips may be positioned outside a left and right side of the frame, respectively, for securing one or more bags in the basket. For example, a first strap of a bag may extend over the top of the frame and may attach to a first bag clip on the outside of a left side of the frame, while another strap of the bag may extend outside the basket and attach to a second bag clip outside a right side of the frame. Thus, a user may place items into the bag and, upon completing the shopping session, may remove the straps from the respective bag clips to acquire the items. Again, the bag may reside in the basket in a way that does not occlude the FOVs of the cameras directed substantially towards the interior of the basket.

In some examples the optical axes of the cameras may be directed upward relative to the top of the basket of the cart. For example, the top of the basket of the cart may be disposed in a substantially horizontal plane. The optical axes of the cameras may be directed along the horizontal plane, or upward relative to the horizontal plane, such that the proximity sensors detect the items, and the cameras generate image data representing the items, while the items are at or above the top of the basket (and prior to being placed in a bag or other item carrier). Accordingly, the optical axis of the four example cameras may be directed towards an interior of the perimeter of the top of the basket (e.g., towards a middle or centroid of the perimeter of the basket), and upward relative to a horizontal plane in which the top of the basket is disposed. In this way, the FOVs for each of the cameras may at least partially overlap at a location above, and potentially central to, the perimeter of the top of the cart to define a "sweet spot" or "target zone" where items are detected and/or captures by all four of the cameras.

To utilize a smart cart as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or carts, can recognize the user. For instance, the user may have registered to identify themselves to the cart using any identification technique, such as presenting an identification means to the first camera/scanner positioned on the frame of the cart (e.g., presenting a driver's license, presenting a facility-issued card, presenting a user identifier via a mobile phone, etc.), speaking a predefined utterance (e.g., a name of the user, a predefined keyword, etc.), and/or biometric information that may be used recognition. Once a user has identified themselves to a smart cart, the user may begin a shopping session where the smart cart identifies and track items retrieved by the user and placed in the smart cart.

In examples where the smart cart includes proximity sensors, the smart cart may continuously operate the proximity sensors to detect movement of items above the top of the cart. The proximity sensors may generate sensor data that indicates whether an item or object is with a threshold range of distances from the top of the cart (e.g., within 6 inches, within 1 foot, within 2 feet, etc.). The sensor data may be analyzed to detect an item above the perimeter of the top of the cart and trigger the light sources to begin illuminating light and the cameras to begin generating image data. The image data generated by the second camera(s) may be analyzed by the software components to determine whether or not an item is being placed in the cart or removed from the cart. For instance, the image data may represent, over time, movement of the item into the cart, or out of the cart. Additionally, the image data may be analyzed using various techniques to determine an item identifier. Various techniques may be utilized to process image data for identifying the item identifier of the item, such as text recognition, object recognition, and/or other techniques. Upon determining the item identifier, such as determining that the item corresponds to "Strawberry Yogurt," the software components on the cart may store an indication that the item identifier was added to the cart, or removed from the cart, and update a virtual shopping cart accordingly.

After the user has moved throughout the materials handling facility and selected the items they desire to purchase or otherwise take from the facility, the user may end the shopping session in various ways. For instance, the user may return the cart to a cart corral, provide input to the cart indicating an end of the shopping session (e.g., utterance, utilize a user interface element on a touch display, etc.), or simply remove their bags or other item carriers from the cart and leave the facility. After the user has ended their shopping session, the list of item identifiers in the virtual shopping cart may be uploaded to one or more remote servers that manage user accounts for users of the facility. The servers may charge the appropriate user account for the listing of the items in the virtual shopping cart that the user took from the facility.

Although some of the techniques described below are performed locally on the cart, in other examples, some or all of the techniques may be performed by one or more backend devices or servers associated with the facility. For instance, the sensor data and/or image data may be collected at the cart and sent over network(s) to backend devices at the facility, or server devices located remote from the facility, to be processed remotely. However, in some instances it may be advantageous for at least some of the processing to be performed on the cart to reduce latency in identifying items placed in the cart. For instance, it may be advantageous to have low latency when requesting that a user provide feedback to help identify an item recently placed in the cart, rather than the user continuing their shopping session and being asked later about an item. Further, while various techniques described below are with reference to purchasing items in a retail facility, the techniques are generally applicable to any materials handling facility in which a user may place items in a cart. For example, although the techniques described herein are primarily with reference to identifying items placed in a cart by a user for the purpose of identifying a user account to charge for items selected from a materials handling facility, the techniques are equally applicable to any industry in which user recognition may be helpful. For instance, the idem-identifying cart may be implemented for distribution centers where employees collect items from various locations to be shipped through the mail system.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
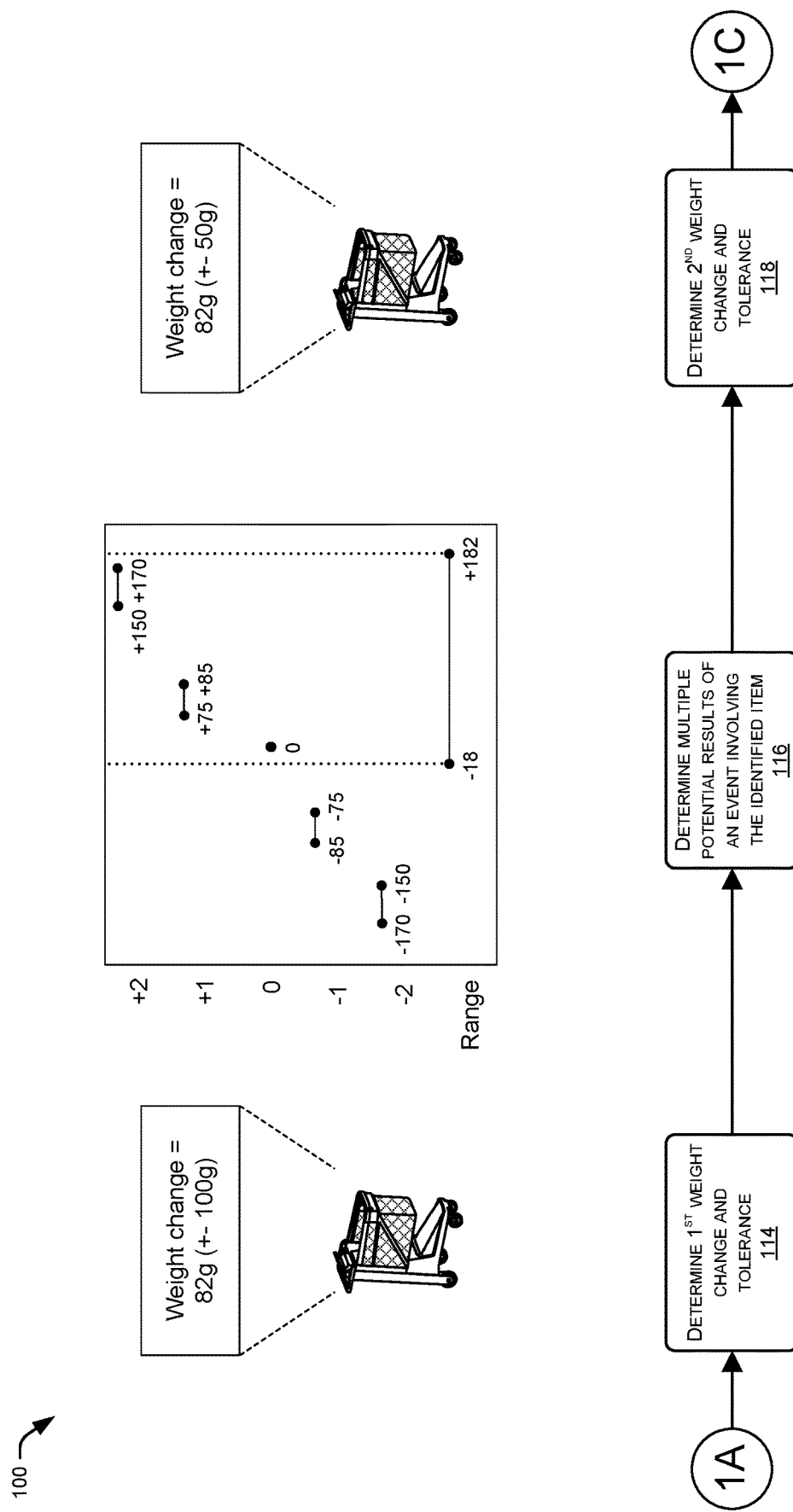
Figure 1C:
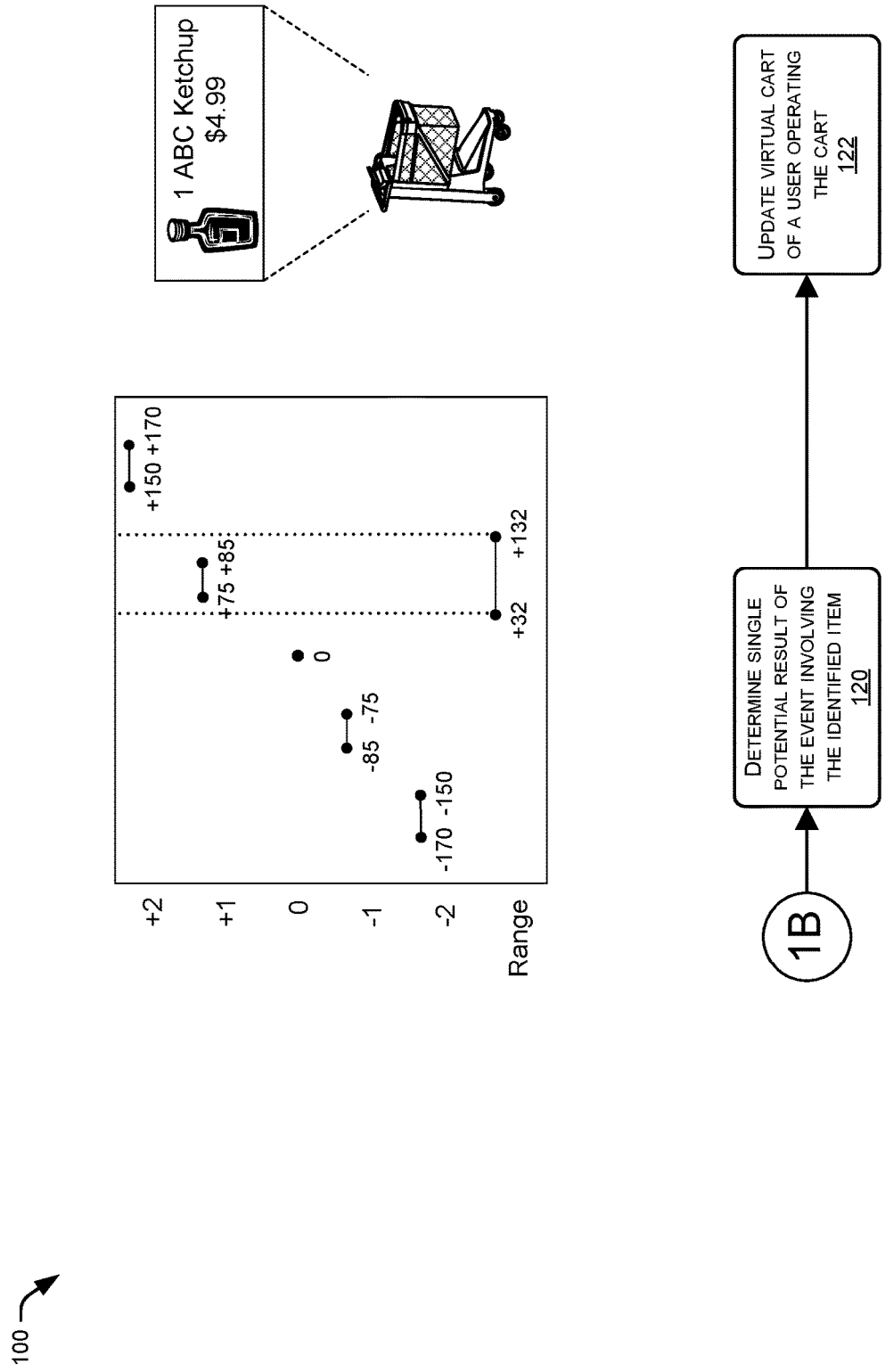

FIGS. 1A-C collectively illustrate an example sequence of operations 100 to illustrate the techniques described herein. As illustrated, a user may place one or more items 104 into an item-identifying cart 102, thus resulting in an event 106, which the cart 102 may attempt to resolve by determining the item(s) involved, the action take (e.g., placed into cart, removed from cart, etc.), and a quantity of the item(s) involved.

At an operation 108, the cart 102 generates sensor data as the item 104 is placed into the cart. For example, one or more cameras coupled to the cart (or one or more cameras in an environment of the cart, such as overhead cameras) may generate image data as the user places the item into a basket of the cart. In addition, one or more weight sensors coupled to the basket of the cart may generate weight data indicative of a weight of the cart and/or a change in weight of the cart. As noted above and described further below, this weight data may include an indication of a change in weight of the basket (or an actual weight of the basket, which may be used to determine the change in weight) and an indication of a tolerance within the which the weight is likely to be accurate (e.g., within 5,000 grams, within 100 grams, etc.).

An operation 110 represents the cart identifying the item using the generated sensor data. For example, this may include an item-identification component using one or more trained localizers and/or classifiers to identify, from image data, visual indicia for identifying the item, such as a shape of the item, text printed in the item, a barcode or other identifier on the item, and/or the like. It is to be appreciated that the cart may identify multiple items when a user places multiple items into the cart at or near a same time. Further, other sensor data, such as weight data, may be used in addition or in the alternative to identify the item. In this example, the cart determines that the item is "ABC Ketchup". The cart 102 also uses this information to determine, from an item catalog, a weight associated with the item and a tolerance of this weight. In this example, the item catalog indicates that the ketchup is associated with a weight of 80 grams and a tolerance of +/−5 grams.

An operation 112 represents the cart determining that there is no activity in the cart. For example, after a predefined amount of time without the generated image data representing any activity, such as a user reaching into the basket, an activity-detection component of the cart may determine that activity has ceased. This determination may result in an event-determination determining that it is now safe to be analyzing the sensor data to determine a result of the event 106, given that the user is not interacting with (and, thus, potentially changing) the items in the basket of the cart.

FIG. 1B continues the illustration of the sequence of operations 100 and includes, at 114, the cart determining a first weight change and an associated tolerance. For example, one or more weight sensors of the cart may determine a weight change in the basket (or a current weight, which may be used to determine the weight change) and provide this data to the weight-change component of the cart. The weight-change may use this data to determine the first weight change and an associated tolerance—that is, the range around the weight change that the event-determination component determines is very likely (e.g., 0.95, 0.99, etc.) to include the real-world weight change of the basket. In some instances, the weight sensors continuously or periodically provide a weight signal to the weight-change component, which uses this signal to calculate the tolerance. In the illustrated example, the weight-change component determines that the basket has experienced a change in weight of +82 grams with a tolerance of +/−100 grams.

An operation 116 represents the cart determining multiple potential results of the event 106 involving the identified item. For example, the event-determination component may determine the change in weight that would be experienced between removal of a predefined number of instances of the identified item and addition of a predefined number of instances of the identified item. In this example, the event-determination component determines respective weight changes that the basket would experience if two instances were removed to two instances being added. For example, the event-determination component determines that two instances of ABC ketchup being removed from the cart would result in a weight change of −170 to −150 grams, using the weight and tolerance of the ABC ketchup. Similarly, the event-determination component determines that removal of one instance would result in a weight change of −85 to −75 grams, removal or addition of no instances would result in no weight change, addition of one instance would result in a weight change of +75 to +85 grams, and addition of two instances would result in a weight change of +150 to +170 grams.

In addition, the event-determination component uses the weight data determine at the operation 114 to determine the weight range representing the possible weight change actually experienced in the basket. In this example, the event-determination component determines that the weight range is −18 grams (82 grams less 100 grams) to +182 grams (82 grams+100 grams). As illustrated, the event-determination component uses this data to determine that three possible outcomes exist regarding the event 106, namely that the user did not add or remove any instances of the ketchup, that the user added one instance of the ketchup, and the that the user added two instances of the ketchup. Given that there are still three possible solutions, and that the weight range was not based on the smallest tolerance determinable by the weight-change component, the event-determination component does not select one of the three potential results but rather awaits additional data from the weight-change component.

At an operation 118, the weight-change component determines a second weight change and an associated tolerance. In this example, the weight-change component determines that the basket has experienced a weight change of +82 grams and that it is confident in that reading within +/−50 grams.

FIG. 1C continues the illustration and includes, at an operation 120, determining that only a single potential result exists to explain this change in weight. That is, as illustrated, only the range associated with the addition of a single addition of the identified item falls within the weight range determined by the event-determination component of +32 grams to +132 grams.

An operation 122 represents the cart updating a virtual cart of the user to indicate the outcome of the event 106. That is, the cart may update the virtual cart to indicate that the user has added one bottle of ABC ketchup to their cart, with a cost of $4.99. A display of the cart may also present a UI indicating this addition as well.

Figure 2A:
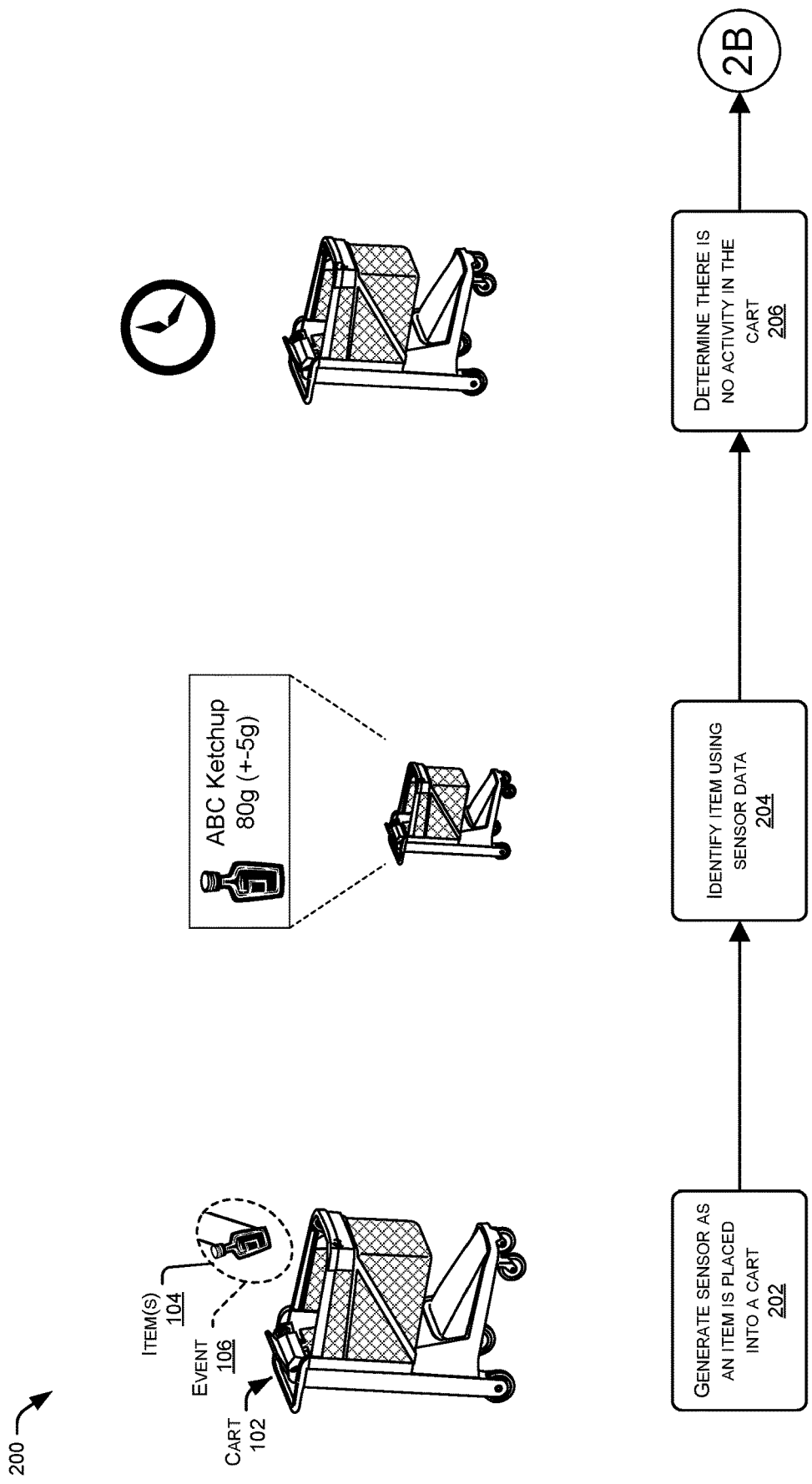
FIGS. 2A-B collectively illustrate an example sequence of operations in which a user again places an item into an item-identifying cart, which identifies the item using image data generated by one or more cameras mounted to the cart. After identifying the item, the cart uses weight data generated by one or more weight sensors of the cart and a known information regarding the identified item to determine possible outcomes of an event involving the identified item, such as an action related to the item (e.g., take or return) and a quantity involved. In this example, the cart determines that there no possible outcomes exist and, thus, generates and presents a user interface (UI) indicating an error.
Figure 2B:
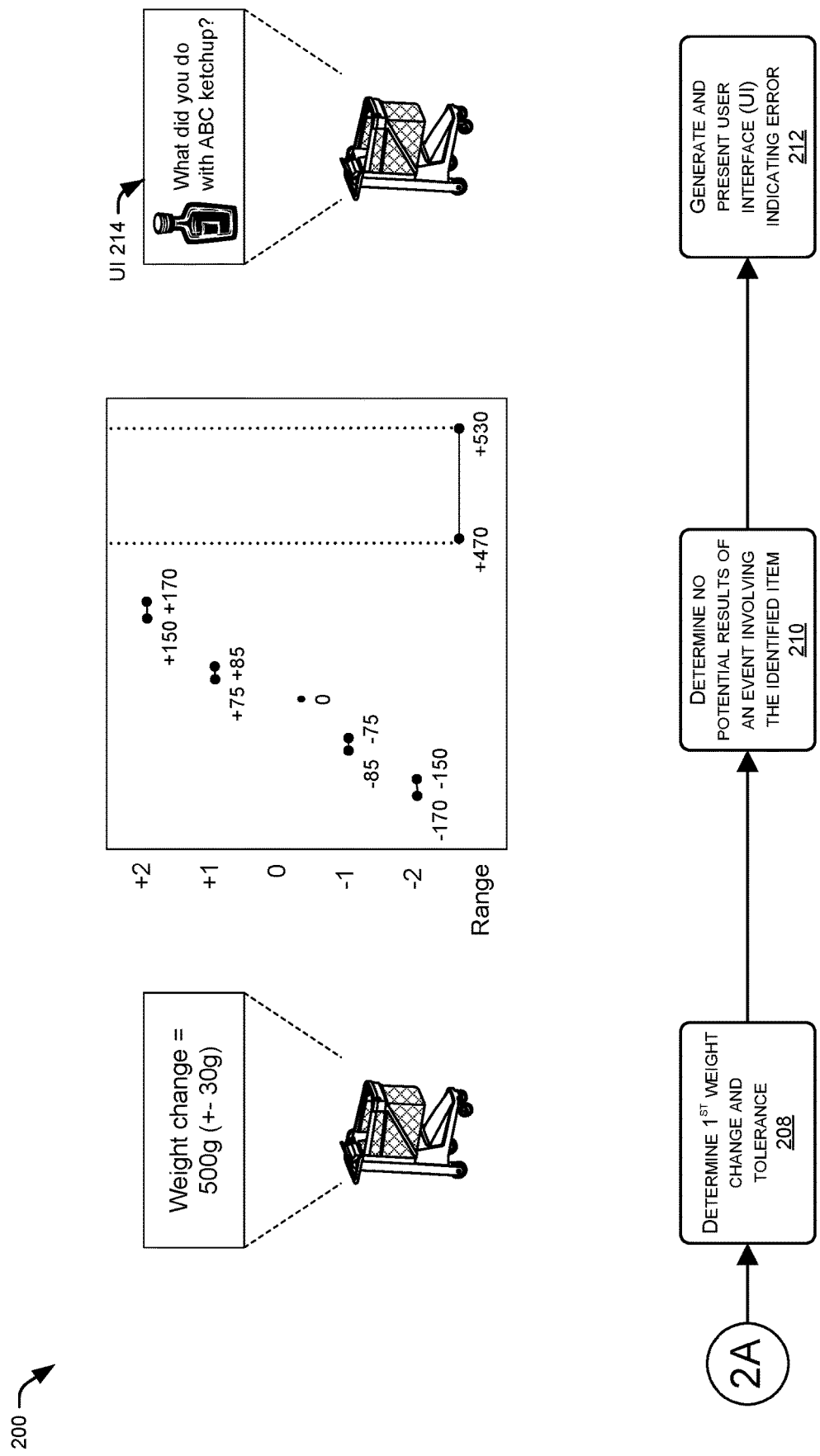

FIGS. 2A-B collectively illustrate another example sequence of operations 200. Again, a user may place one or more items 104 into the item-identifying cart 102, thus resulting in the event 106, which the cart 102 may attempt to resolve by determining an outcome of the event (e.g., the item(s) involved, the action take (e.g., placed into cart, removed from cart, etc.), and a quantity of the item(s) involved).

At an operation 202, the cart 102 generates the sensor data as the item 104 is placed into the cart. Again, one or more cameras coupled to the cart (or one or more cameras in an environment of the cart, such as overhead cameras) may generate image data as the user places the item into a basket of the cart. In addition, one or more weight sensors coupled to the basket of the cart may generate weight data indicative of a weight of the cart and/or a change in weight of the cart. As noted above and described further below, this weight data may include an indication of a change in weight of the basket (or an actual weight of the basket, which may be used to determine the change in weight) and an indication of a tolerance within the which the weight is likely to be accurate (e.g., within 5,000 grams, within 100 grams, etc.).

An operation 204 again represents the cart identifying the item using the generated sensor data. For example, this may include an item-identification component using one or more trained localizers and/or classifiers to identify, from image data, visual indicia for identifying the item, such as a shape of the item, text printed in the item, a barcode or other identifier on the item, and/or the like. It is to be appreciated that the cart may identify multiple items when a user places multiple items into the cart at or near a same time. Further, other sensor data, such as weight data, may be used in addition or in the alternative to identify the item. In this example, the cart determines that the item is "ABC Ketchup". The cart 102 also uses this information to determine, from an item catalog, a weight associated with the item and a tolerance of this weight. In this example, the item catalog indicates that the ketchup is associated with a weight of 80 grams and a tolerance of +/−5 grams.

An operation 206 represents the cart determining that there is no activity in the cart. For example, after a predefined amount of time without the generated image data representing any activity, such as a user reaching into the basket, an activity-detection component of the cart may determine that activity has ceased. This determination may result in an event-determination determining that it is now safe to be analyzing the sensor data to determine a result of the event 106, given that the user is not interacting with (and, thus, potentially changing) the items in the basket of the cart.

FIG. 2B continues the illustration of the sequence of operations 200 and includes, at an operation 208, the cart 102 determining a first weight change and an associated tolerance. For example, one or more weight sensors of the cart may determine a weight change in the basket (or a current weight, which may be used to determine the weight change) and provide this data to the weight-change component of the cart. The weight-change may use this data to determine the first weight change and an associated tolerance—that is, the range around the weight change that the event-determination component determines is very likely (e.g., 0.95, 0.99, etc.) to include the real-world weight change of the basket. In some instances, the weight sensors continuously or periodically provide a weight signal to the weight-change component, which uses this signal to calculate the tolerance. In the illustrated example, the weight-change component determines that the basket has experienced a change in weight of +500 grams with a tolerance of +/−30 grams.

An operation 210 represents the cart determining that there are no potential results of the event 106 involving the identified item. For example, the event-determination component may determine the change in weight that would be experienced between removal of a predefined number of instances of the identified item and addition of a predefined number of instances of the identified item. Again, in this example, the event-determination component determines respective weight changes that the basket would experience if two instances were removed to two instances being added. For example, the event-determination component determines that two instances of ABC ketchup being removed from the cart would result in a weight change of −170 to −150 grams, using the weight and tolerance of the ABC ketchup. Similarly, the event-determination component determines that removal of one instance would result in a weight change of −85 to −75 grams, removal or addition of no instances would result in no weight change, addition of one instance would result in a weight change of +75 to +85 grams, and addition of two instances would result in a weight change of +150 to +170 grams.

In addition, the event-determination component uses the weight data determine at the operation 114 to determine the weight range representing the possible weight change actually experienced in the basket. In this example, the event-determination component determines that the weight range is +470 grams (500 grams less 30 grams) to +530 grams (500 grams+30 grams). As illustrated, the event-determination component uses this data to determine that none of the generated outcomes has an associated range that overlaps with the weight range as determined using the weight data from the weight-change component.

Figure 8:
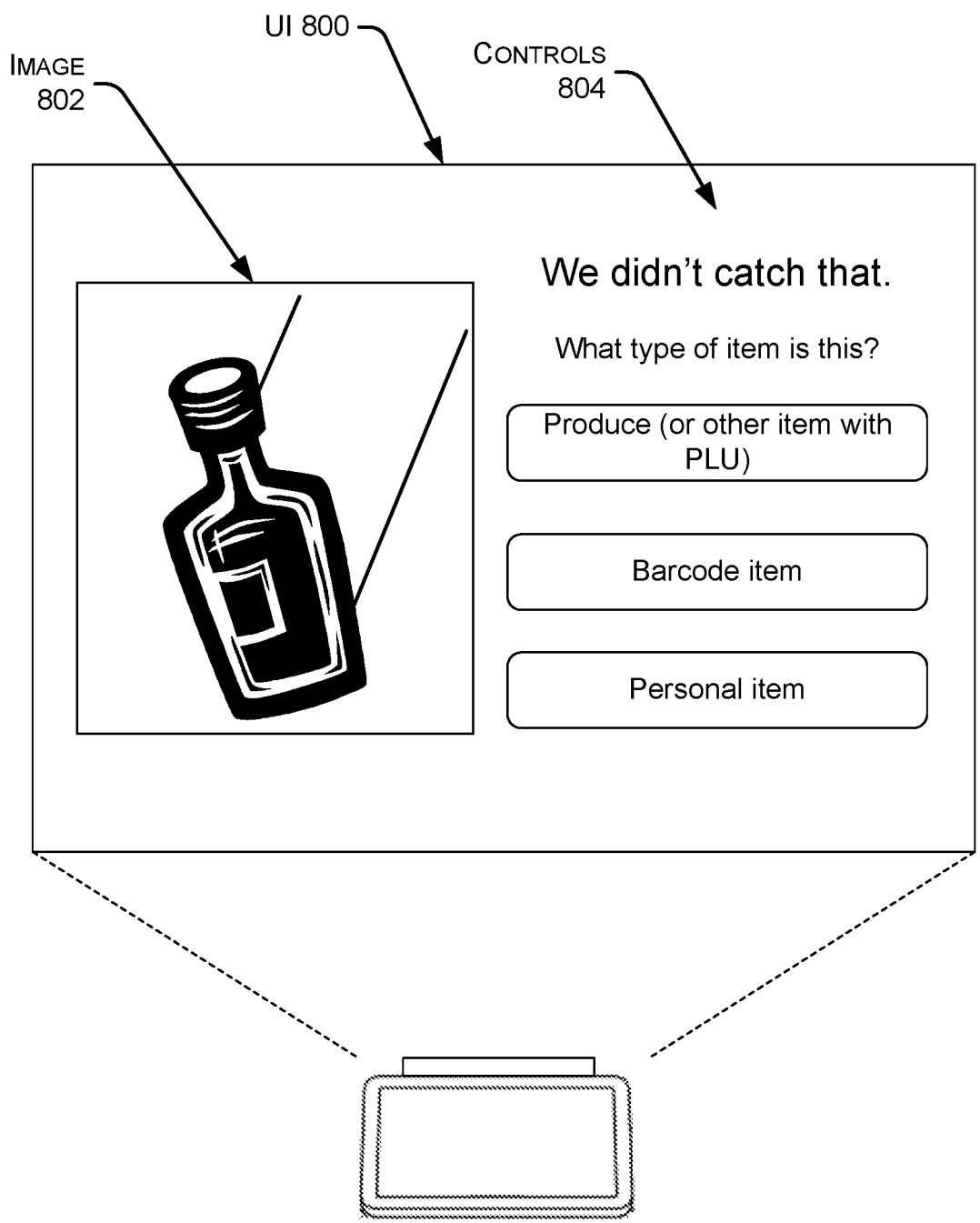
FIG. 8 illustrates an example UI that a display of an item-identifying cart may present in response to failing to identify an item placed into the cart. As illustrated, the UI may include one or more frames of image data that the cart generated while a user placed the item into the cart, as well as one or more controls to enable the user to identify the item.
Figure 9:
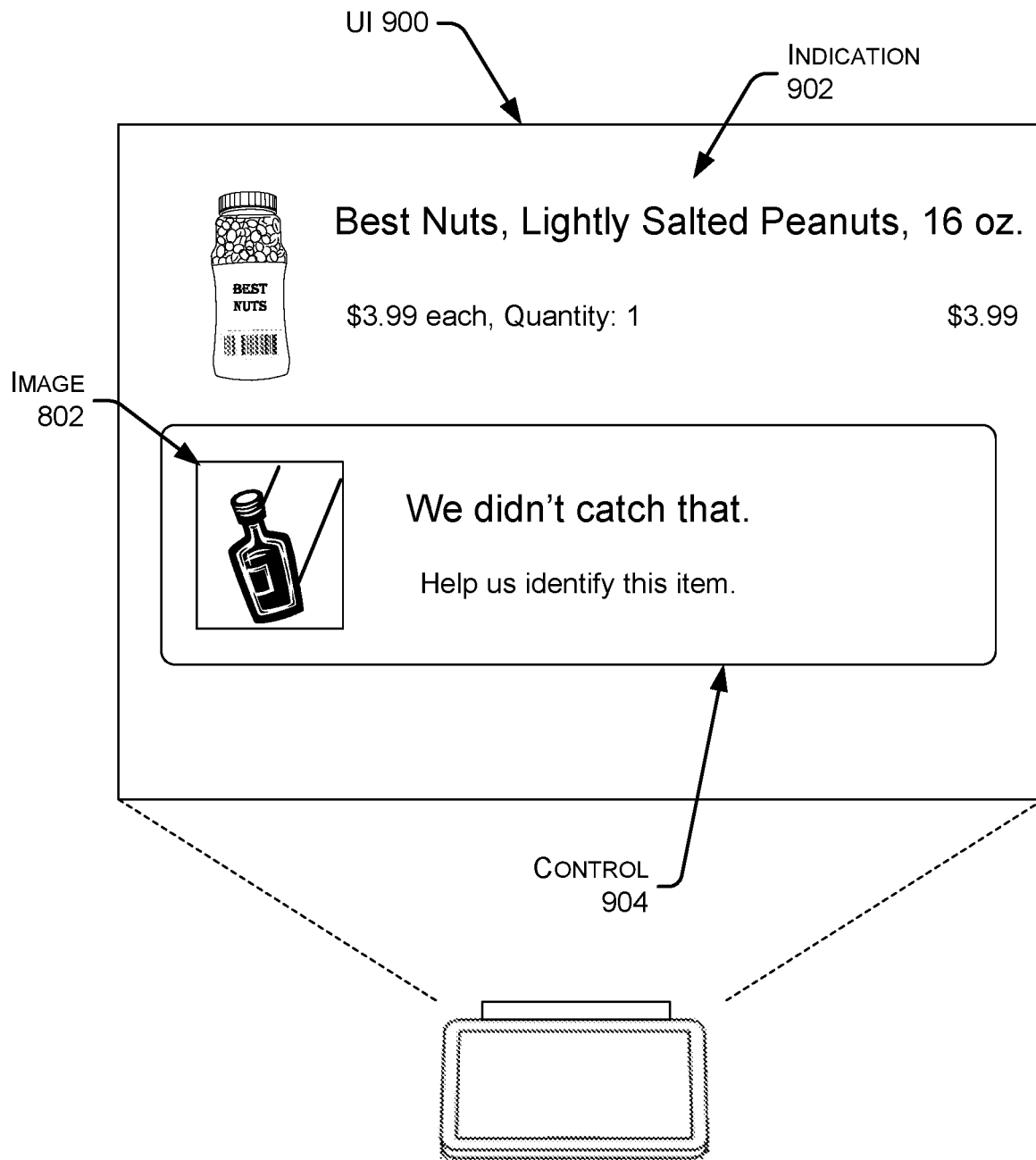
FIG. 9 illustrates an example UI that the display of the item-identifying cart may present after presenting the UI of FIG. 8 and after the user places a subsequent item into the cart.
Figure 10:
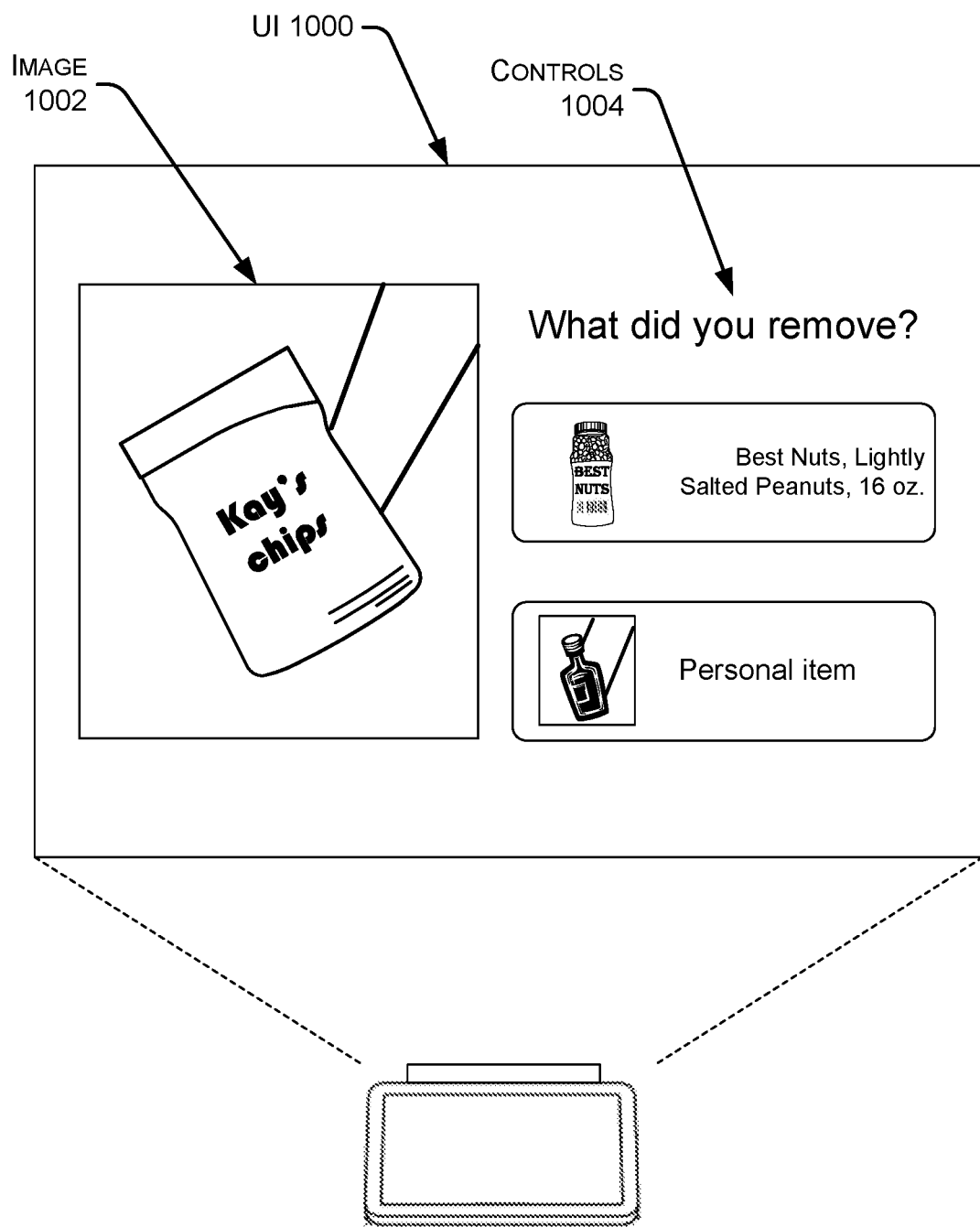
FIG. 10 illustrates an example UI that the display of the item-identifying cart may present in response to failing to identify an item removed from the cart. As illustrated, the UI may include one or more frames of image data that the cart generated while a user removed the item from the cart, as well as one or more controls to enable the user to identify the item.

An operation 212 thus represents generating and presenting a UI 214 indicating the error. For example, the UI 214 may include image data associated with the item and acquired from an item catalog, image data of the item being placed into the cart, and/or the like. In addition, the UI 214 may include selectable icons to enable a user to state what he or she did with the item (or at least help the cart make the determination by re-placing the item into the cart, re-removing the item from the cart, scanning the item using the camera(s), and/or the like). FIGS. 8-10 illustrate and describe example UIs below. Further, while the example UI 214 includes the question "What did you do with ABC ketchup?", in other instances this UI, or a subsequent UI, may ask other questions, such as questions regarding whether the user also interacted with another item and/or the like.

FIG. 3 illustrates yet another example sequence of operations 300. Again, an operation 302 represents the cart 102 generating the sensor data as the item 104 is placed into the cart. Again, one or more cameras coupled to the cart (or one or more cameras in an environment of the cart, such as overhead cameras) may generate image data as the user places the item into a basket of the cart. In addition, one or more weight sensors coupled to the basket of the cart may generate weight data indicative of a weight of the cart and/or a change in weight of the cart. As noted above and described further below, this weight data may include an indication of a change in weight of the basket (or an actual weight of the basket, which may be used to determine the change in weight) and an indication of a tolerance within the which the weight is likely to be accurate (e.g., within 5,000 grams, within 100 grams, etc.).

An operation 304 represents, however, that the item has not been identified. For example, this operation may represent the item-identification component failing to recognize the item with a threshold confidence.

An operation 306, thus, represents generating and presenting a UI 308 indicating the error. In this example, the UI 214 may include image data associated with the item and acquired from an item catalog, image data 310 of the item as the user placed the item into the cart and/or one or more selectable icons to enable a user to help identify the item (or at least help the cart identify the item by re-placing the item into the cart, scanning the item using the camera(s), and/or the like). In some instances, the image data 310 is selected based on this image data having a confidence level indicating whether it represents the unidentified item that is a highest confidence level of image data within a time range associated with the unresolved event. Portions of FIGS. 4-7 illustrate and describe how the cart stores and selects this image data 310. In addition, FIGS. 8-10 illustrate and describe example UIs below.

Figure 4:
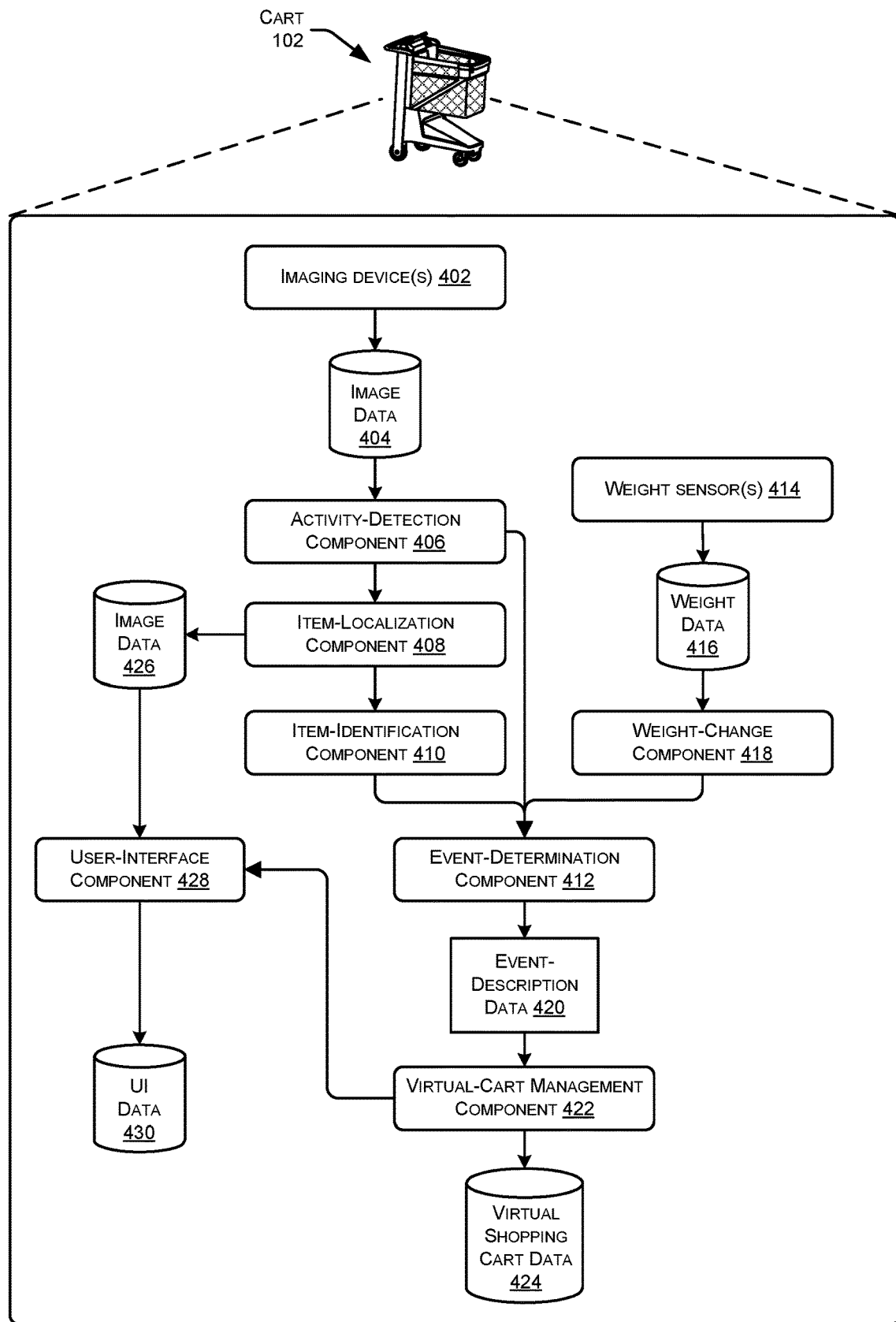
FIG. 4 illustrates example components of an item-identifying cart for determining respective results of events involving items placed into, or removed from the cart, and components for generating image data and UIs that include a portion of the image data.
Figure 11:
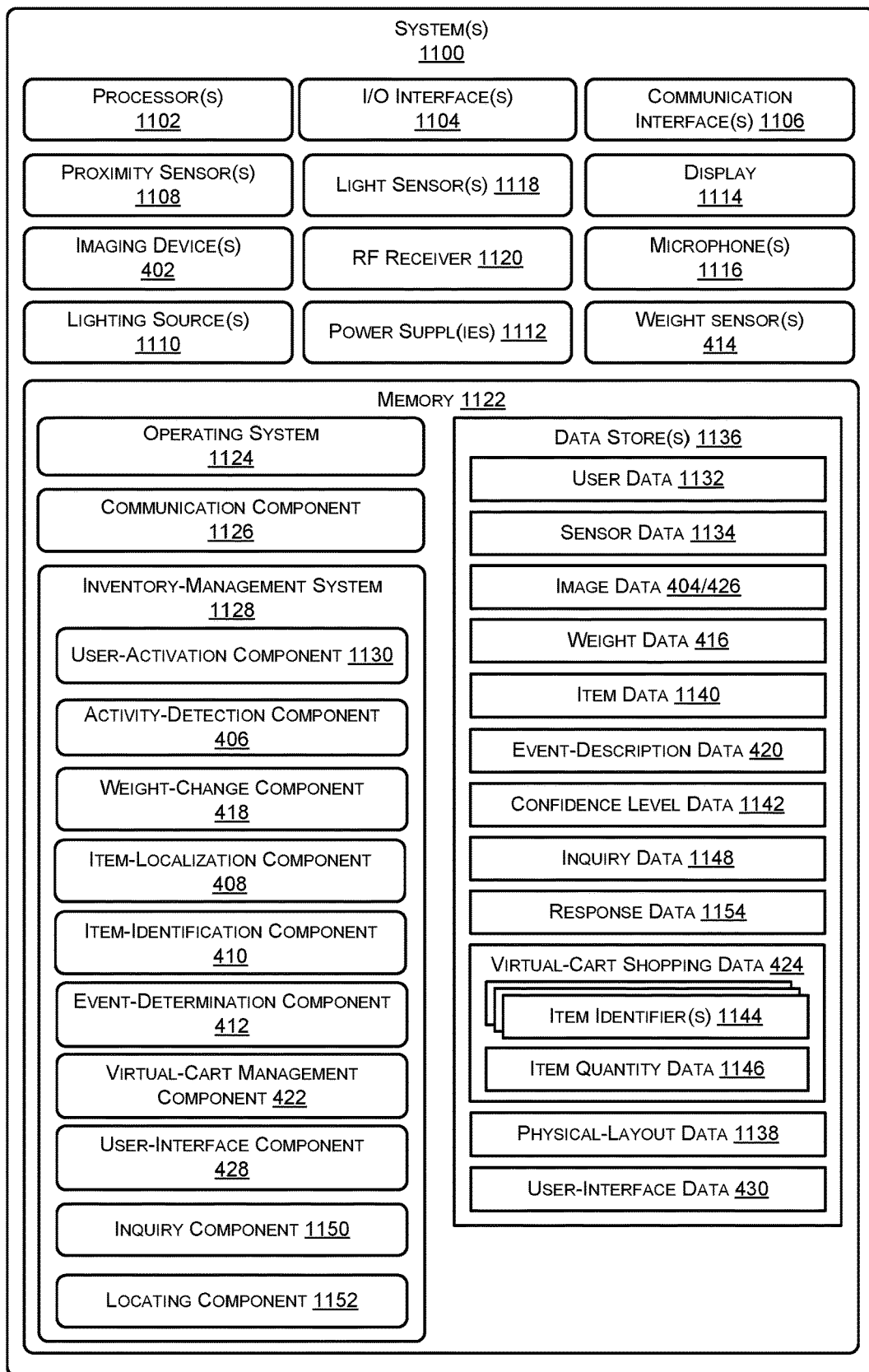
FIG. 11 illustrates example components of one or more systems configured to support an inventory-management system that includes functionality to perform the techniques described herein. In some instances, the systems may comprise a tote (e.g., an item-identifying cart, basket, etc.), one or more computing devices within a facility, one or more computing devices that are remote from the facility, and/or a combination thereof.

FIG. 4 illustrates example components of an item-identifying cart 102 for determining respective results of events involving items placed into, or removed from the cart, and components for generating image data and UIs that include a portion of the image data. It is to be appreciated that while FIG. 4 describes these components as residing on the cart 102, it is to be appreciate some or all of these components may additionally or alternatively reside on one or more devices, such as servers within a facility that includes the cart 102, servers that are remote from the facility, and/or the like. Further, FIG. 11 illustrates and describes additional potential components below. Further, FIGS. 12A-14 describe additional possible details of the cart in much greater detail.

As illustrated, the cart 102 may include one more image devices (e.g., cameras) 402. The imaging devices 402 may generate image data 404, which may represent items being placed into and/or removed from the cart. In general, this image data 404 may be used to identify items and determine events involving the items, in order to maintain an accurate virtual cart of the user.

As illustrated, an activity-detection component 406 may receive and analyze the image data 404 to determine whether the image data represents any activity. For example, the activity-detection component 406 may comprise one or more trained classifiers configured to detect whether the image data 404 represents any predefined activity within an airspace of the basket of the cart 102 (e.g., a user's hand, an item, etc.). If there are no pending events to resolve and the activity-detection component 406 does not detect activity, then the activity-detection component 406 may set its flag to false and no further processing may occur for the time being. If, however, there is no unresolved events and the activity-detection component 406 detects activity (e.g., by setting its flag to true), then the cart 102 may begin a process for identifying one or more items from the image data. In addition, upon the activity-detection component 406 setting its flag back to false, the cart 102 may begin attempting to determine the outcome of the event involving any identified items.

Upon the activity-detection component 406 detecting activity, an item-localization component 408 may analyze the image data 404 to identify, on a frame-by-frame basis, whether the respective frame includes one or more portions that include an item. In some instances, the item-localization component 408 may comprise one or more trained localizers that receive, as input, a frame of image data and, if the localizer(s) detect an item, outputs an indication of a portion (e.g., coordinates of a bounding box) of the frame that includes an item, along with a confidence level that this portion includes an item. In some instances, the trained localizer(s) may output multiple portions and respective confidence levels. Further, FIG. 4 indicates that in some instances, the activity-detection component 406 may send an indication to the event-determination component 412 in response to detecting activity (or a lack thereof). In some of these instances, the event-determination component 412 may begin analysis of the inputs it has received, regardless of whether the item-identification component has provided an input comprising the identity associated with an item in the image data. For example, if a user places their hand in the cart, without an item, the activity-detection component 406 may detect this activity and notify the event-determination component 412, while the item-identification component 410 would not identify an item (given that there is no item in the image data in this example).

After the item-localization component 408 identifies portions of the frames of the image data 404 that includes items, an item-identification component 410 may attempt to identify the item(s) from these portions. For example, the item-identification component 410 may comprise one or more trained classifiers that receive, as input, the portions of the frame identified by the item-localization component 408 and attempt to determine an item identifier associated with each respective item. The trained classifiers of the item-identification component 410 may identify the items based on identifying text of the items, barcodes of the items, and/or the like. The item identifiers output by the item-identification component 410 may also be associated with respective confidence values, as determined by the classifier(s). These item identifiers and corresponding confidence values may be provided to an event-determination component 412, which may attempt to determine the outcome(s) of any event(s) involving these items, as described below. In some instances, the item-identification component 410 provides, to the event-determination component 412, an indication that the item-identification component 410 was unable to identify the item(s).

As illustrated, the cart 102 may further include one or more weight sensors 414 configured to generate weight data 416. A weight-change component 418 may receive the weight data and determine a tolerance associated with a current weight or change in weight as determined by the weight sensors. For example, the weight sensors 414 may provide a continuous or periodic signal indicating a weight of the basket or a change in weight of the basket, which the weight-change component 418 may use to determine a tolerance—or a range around which the weight-change component 418 determines, with a threshold amount of certainty, that the current weight or change in weight as reported by the weight sensors 414 represents the real-world weight or change in weight. As described above, the weight-change component may thus output an indication of a current weight, or change in weight, along with a corresponding tolerance or range. In some instances, this tolerance or range output by the weight-change component 418 is one of multiple predefined tolerances or ranges. For example, the weight-change component 418 may be configured to output an indication of a current change in weight and a tolerance or range of +/−5,000 grams, +/−500 grams, +/−100 grams, +/−60 grams, +/−30 grams, and +/−1 gram. Of course, while this is just one example, other predefined tolerances or ranges may be used in other instances.

The event-determination component 412 may receive, from the weight-change component 418, the weight-change data, which may include an indication of a change in weight and an associated tolerance or range. The event-determination component 412 may use this information, along with the item-identification data received from the item-identification component 410, to determine the outcome of the event involving the identified item(s).

In some instances, the event-determination component 412 may determine the outcome of events by generating respective scores for different possible outcomes of a given series of events. To provide an example, the event-determination component 412 may receive an indication of one or more items identified since the last update to the virtual shopping cart data and the change in weight of the basket of the cart since the last update. In addition, the event-determination component 412 may receive, or may determine, a weight associated with each of the identified items. For example, the event-determination component 412, or another component, may access catalog data using an identifier of each of the identified items to determine a catalog weight associated with each respective item. With this information, the event-determination component 412 may generate one or more hypotheses of how to explain the change in weight of the basket given the identified items (and their catalog weights). In some instances, each hypothesis may indicate an action take with respect to an identified item (e.g., take or return) and a count of each respective item (e.g., zero, one, two, etc.).

In some instances, the event-determination component 412 may determine that a determined hypothesis is associated with a confidence score that is greater than a threshold score and, thus, the virtual shopping cart data may be updated according to this hypothesis. In other instances, the event-determination component 412 might not determine a hypothesis that is greater than the threshold score and, thus, an alarm (e.g., visual, audible, etc.) or other feedback may be output to the user. For example, a lighting element of the cart may be illuminated orange, red, or the like, a display on the cart may indicate that no outcome was determined, or the like. In still other instances, the event-determination component 412 may determine multiple hypotheses that are associated with respective confidence scores that are each greater than the threshold value. In these instances, the cart may output a request to the user for assistance. For example, the cart may output on a display or other output device a request to indicate which of the determined hypotheses corresponds to the actual event performed by the user. Upon receiving input from the user, the cart may update the virtual shopping cart data accordingly.

In some instances, the event-determination component 412 generates the hypotheses and assigns them respective scores using a breadth-first search (BFS) or any other known algorithm. In other examples, the event-determination component may generate a combination of each possible count, bounded by a particular integer of counts (e.g., each possible combination of counts between +n (a number of n instances of the item added to the cart) and −n (a number of n instances of the item removed from the cart)). Further, given that noise may exist in the measurement of the weight of the basket, the event-determination component 412 may be configured to compute a score associated with each respective hypothesis using a probabilistic approach, such:

$$\text{Score} = (\text{counts, delta}) = Pr(\text{counts} \mid \text{delta}) = Pr(\text{delta} \mid \text{counts}) * \frac{Pr(\text{counts})}{Pr(\text{delta})}$$

In this example, the event-determination component 412 may be configured to assume that Pr(delta) is uniform and, thus, does not change the relative probabilities of one hypothesis over another. Further, given the above, the event-determination component 412 may be configured to compute Pr(delta|counts) (e.g., the probability that the weight of the basket has changed (delta) given the outcome implied by the counts) and Pr(counts) (e.g., the probability that the user performed the outcome implied by the counts).

In some instances, this latter probability (Pr(counts)) may be item-specified, user-specific, facility-specific, and/or the like. For instance, some items may be consistently purchased according to a certain count, such as singularly, in pairs, or the like. For example, historical shopping data may indicate that a first item, such as laundry detergent, is typically purchased one at a time and, thus, the likelihood of a count of +1 (addition of one instance of laundry detergent) may be greater than a likelihood of a count of +2 (addition of two instances). In another example, historical shopping data may indicate that a second item, such as a can of tuna, is typically purchased in multiple quantities. Thus, the likelihood of a count of +1 (addition of one instance of an identified can of tuna) may be less than a likelihood of a count of +2 (addition of two instances).

In addition, or in the alternative, this probability may be user-specific and/or facility-specific. For example, the event-determination component 412 may determine a probability of particular counts based on prior behavior of a particular user operating the cart. For example, if a user associated with a particular cart consistently places three instances of bread into her cart, then this particular count may be associated with a relatively high probability or likelihood. Further, if users at a particular facility often place two instances of chips into their carts, this probability may be relatively high. Further, in some instances a probability of a particular count of an item may be based on additional factors, such as current contents of the cart of the user, time of day, day of week, or the like. For example, if a user is determined to have added two packs of hot dogs to her cart, and hot-dog buns are later identified, the probability associated with the addition of two packages of hot-dog buns may be greater than the probability associated with the addition of one package.

To provide one example of Pr(counts), the event-determination could determine a probability that a user added or removed a number of counts of an identified item between zero (0) and three (3). For example, the event-determination component 412 may be configured to determine with probabilities that a user removed three instances of the same item, added three instances of the same item, and each possibility therebetween. As described above, these probabilities may be generic (e.g., the same for each user, item, facility, etc.) or may be user-specific, item-specific, facility-specific, and/or the like. Further, while the following example describes probabilities for adding or removing three instances of a particular item, any other number of instances may be computed in other examples. In one example, the event-determination component 412 may be configured according to the following probabilities:

$$Pr(counts[item]=+1=60\%$$

$$Pr(counts[item]=-1=25\%$$

$$Pr(counts[item]=0=10\%$$

$$Pr(counts[item]=+2=3\%$$

$$Pr(counts[item]=-2=1\%$$

$$Pr(counts[item]=+3=0.8\%$$

$$Pr(counts[item]=-3=0.2\%$$

In the above example, the event-determination component 412 is configured with a 60% probability that a user added a single instance of an item to her cart, a 25% probability that the user removed a single instance of the item from her cart, a 10% chance that the user made no change with regards to the item (e.g., placed the item into the cart before removing it), a 3% probability that the user added two instances of the item to her cart, a 1% probability that the user removed two instances of the item from her cart, a 0.8% probability that the user added three instances of the item to her cart, and a 0.2% probability that the user removed three instances of the item from her cart.

With regards to Pr(delta|counts), if each measurement did not include an error, then the event-determination component 218 may compute a difference between the implied weight change and the actual weight change according to the following:

$$\text{Implied weight}=\text{sum}(\text{counts}[item]*\text{catalog weight}[item])$$

$$\text{error}=\text{absolute value}(\text{implied weight}-\text{delta})$$

Here, the Pr(delta|counts) would be 1 if the error is 0 and 0 if the error >0. However, given that the measurements may include error, some tolerance may be introduced such that Pr(delta|counts)=1 if error <tolerance, 0 otherwise.

An example of the above techniques is provided below. It is to be appreciated, however, that this example is one of many and that other algorithms, weights, probabilities, and/or the like may be used by the event-determination component 218 to determine event outcomes. For sake of brevity and understanding, in the following example, the event-determination component 412 receives an indication that two items have been identified since a last update of virtual shopping cart data of a user (a can of soda and a bag of chips), and the event-determination component determines hypotheses for combinations between the addition of two instances of each item and the remove of two instances of each item. Stated otherwise, while this example describes analyzing the possibilities that the user added or removed two or less of each of the two identified items, in other instances the event-determination component 218 may compute more or fewer hypotheses.

In this example, envision that the event-determination component 412 receives an indication that a can of soda has been identified along with a bag of chips, and that the former item is associated with a catalog weight of 300 g and the latter item is associated with a catalog weight of 100 g. In this example, the event-determination component 412 generates a hypothesis from +2 (two instances added to a cart) to −2 (two instances removed from the cart) for each item. Furthermore, envision that the weight sensors determine that the weight of the basket of the cart has increased by 110 grams between a current time and a time associated with a last update the virtual shopping cart data and that a tolerance of 20 g is applied. Assume further that the virtual shopping cart data indicates that the cart already include one instance of the can of soda and one instance of the bag of chips. Further, the Pr(counts) may be similar to that discussed above, although for a range of +2 to −2 counts.

In this example, the event-determination component 412 may calculate twenty-five (25) hypotheses regarding the two identified items, as bounded between +2 and −2, as follows, where the first value corresponds to the can of soda and the second value to the bag of chips. Further, it is to be appreciated that the event-determination component 412 may zero out probabilities that do not make sense given the current state of the virtual shopping cart data.

[1] −2, −2=>0.000
[2] −2, −1=>0.000
[3] −2, 0=>0.000
[4] −2, 1=>0.000
[5] −2, 2=>0.000
[6] −1, −2=>0.000
[7] −1, −1=>0.000
[8] −1, 0=>0.000
[9] −1, 1=>0.000
[10] −1, 2=>0.000
[11] 0, −2=>0.000
[12] 0, −1=>0.000
[13] 0, 0=>0.000
[14] 0, 1=>0.060**

[15] 0, 2=>0.000
[16] 1, −2=>0.006**
[17] 1, −1=>0.000
[18] 1, 0=>0.000
[19] 1, 1=>0.000
[20] 1, 2=>0.000
[21] 2, −2=>0.000
[22] 2, −1=>0.000
[23] 2, 0=>0.000
[24] 2, 1=>0.000
[25] 2, 2=>0.000

As shown above, the event-determination component 412 has computed two non-zero scores: a first score of 0.06 for the outcome where the user did not add or remove any instances of the can of the soda from the cart but placed one instance of the bag of chips into the cart and a second score of 0.006 for the outcome where the user added one instance of the can of soda into the cart and removed two instances of the bag of chips. However, given that the first outcome has a score that is ten times greater than the latter, the event-determination component 412 may output event-description data 420 indicating that this was the result of the event, which may cause a virtual-cart management component 422 to update virtual shopping cart data 424 to indicate an addition of one bag of chips.

In some instances, meanwhile, the event-determination component 412 may use the techniques described above, and in further detail with regards to FIG. 5 described below, prior to generating event-description 420. For example, the event-determination component 412 may (e.g., only) generate the event-description data 420 in instances where a single potential result explains the weight data received from the weight-change component 418 or in instances where the weight data received from the weight-change component 418 is associated with a smallest tolerance. In these latter examples, the event-determination component 420 may generate the event-description data 420 corresponding the potential result associated with a highest likelihood or score, as described in the example immediately above with regards to the bag of chips. Again, after generating the event-description data 420, the virtual-cart management component 422 may update the virtual shopping cart data 424 accordingly.

Returning to the item-localization component 408, however, after identifying respective portions of the frames of the image data that include an item, the item-localization component 408 may determine whether to store these portions as image data 426, which may comprise storing these portions in volatile memory having a limited, defined size such that older data is deleted upon newer data being stored.

Figure 6:
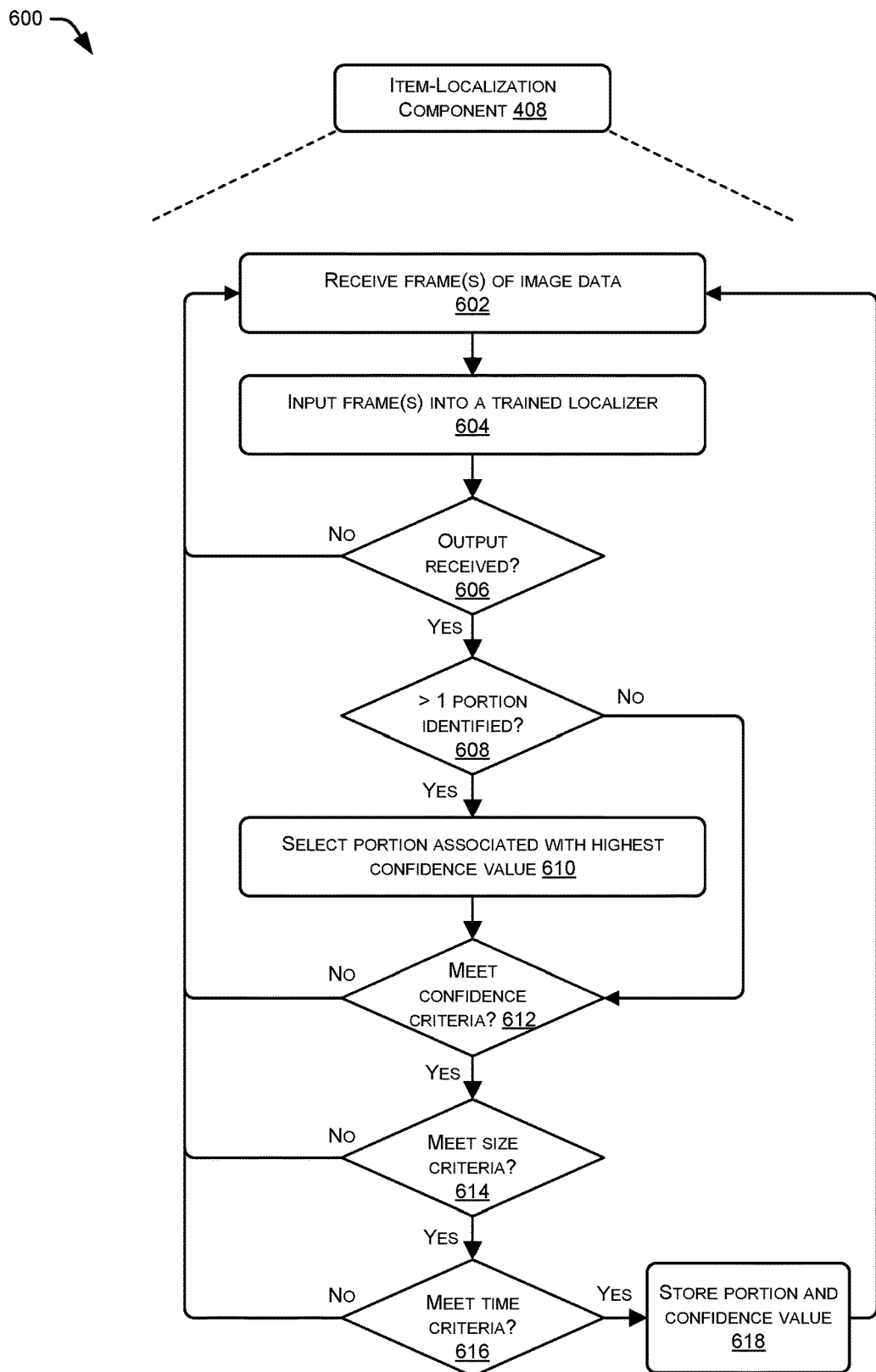
FIG. 6 illustrates a flow diagram of an example process that an item-localization component may perform for determining portions of image data to store for potential later use in UIs presented to a user operating a cart.

In some instances, the item-localization component 408 may determine whether to store these portions of the frames of the image data 404 as image data 426 if the portions meet one or more predefined criteria. For example, as noted above, the localizer(s) of the item-localization component 408 may output a confidence level that a respective portion of a frame (e.g., a bounding box of a frame of image data) represents an item. The item-localization component 408 may determine whether a confidence value associated with a portion of a frame is greater than a threshold confidence value (e.g., 0.65, 0.95, etc.). If not, then the item-localization component 408 may refrain from storing the portion of the frame as image data 426. In addition, or in the alternative, the item-localization component 408 may also determine whether a size of the portion of the frame meets one or more size criteria. For example, the item-localization component 408 may determine whether the size of the portion is less than a threshold size, greater than a threshold size, or the like. If the portion does not meet the size criteria, then the item-localization component 408 may refrain from storing the portion of the frame as the image data 426. In addition, or in the alternative, the item-localization component 408 may determine whether a threshold amount of time has elapsed since last storing a portion of a frame as image data 424, in order to avoid duplicative frames and in order to lessen computational processing. If the threshold amount of time has not elapsed, then the item-localization component 408 may refrain from storing the portion of the frame as image data 426. If, however, a portion of a frame meets one or more (e.g., each) of the criteria, then the item-localization component 408 may store the portion of the frame as the image data 426. IN some instances, the item-localization component 408 stores each frame in association with a timestamp representing the time at which the respective frame was generated, analyzed, processed, and/or the like. FIG. 6 illustrates and describes operation of the item-localization component 408 in greater detail below.

Returning to the event-determination component 412, in some instances this component may be unable to determine the outcome of an event with a threshold amount of confidence. In these instances, the event-determination component 412 may output an indication of an error, which the event-determination component 412 may output in the form of event-description data 420. The virtual-cart management component may receive this error and may provide an indication of the error to a user-interface (UI) component 428. In instances where the item-identification component 410 identified the item involved in the event, the event-determination component may also output this information as event-description data 420, which may also be later received at the UI component 428. In response, the UI component may acquire an image (e.g., from an item catalog, online, etc.) associated with the identified image and may generate and output UI data 430 for presentation to the user of the cart 102. The UI generated using the UI data 430 may include the image of the item, an indication of the error, and a request that the user aid in helping the cart 102 determine the outcome of the event involving the identified item.

In some instances, however, the item-identification component 408 may fail to identify the item. In these instances, the event-determination component 412 may output this indication, which may be received by the UI component 428. In response, the UI component 428 may acquire one or more frames from the image data 426 (e.g., from the volatile memory). For example, the event-determination component 412 may output an indication that an outcome associated with an event that is associated with a time or time range has not been determined, and that the item is unidentified. The UI component may analyze each portion of each frame associated with a timestamp that is within the determined time range (or within a threshold amount of time of a given time of the event) to determine the portion of the frame associated with a highest confidence value. That is, if the unresolved event is associated with a time range of one second, the UI component 428 may analyze the image data 426 to determine, from the frames stored in the image data 426 having respective timestamps that occur within the defined one-second time range, the portion of the frame (or a number of portions of frames) having the highest confidence level, which indicates it is most likely to depict an item.

The UI component may then retrieve that portion of the frame from the image data 426 and generate UI data 430 including the retrieved portion of the frame. For example, the UI component 428 may generate UI data 430 that includes the retrieved image data 426, an indication that the cart 102 was unable to identify the item, and selectable controls to enable the user to help the cart 102 identify the item.

In some instances, however, another item may have been accurately identified during the time window associated with the event involving the unidentified item. In these instances, the event-determination component 412 may provide an indication of a time associated with a resolved event or an identified item, such that the UI component 428 may artificially lower confidence levels of frames of the image data 426 that are near in time to the resolved event involving the identified item. For example, if 0.4 seconds into the example one-second window an item was identified (and an event involving the item was resolved), the UI component 428 may bias downwards the respective confidence levels associated with stored frames of image data that occur near the 0.4-second mark. By doing so, the UI component 428 lessens the chance that, when it selects the frame having the highest confidence level in this time range, it selects a frame depicting the identified item rather than the unidentified item. In some instances, the UI component 428 uses an exponential decay function for biasing downwards the confidence levels of the frames so as to heavily affect frames near the identified item (e.g., at the 0.4 second mark) but not frames further away (e.g., at the 0.2-second mark, the 0.6-second mark, etc.).

Figure 5:
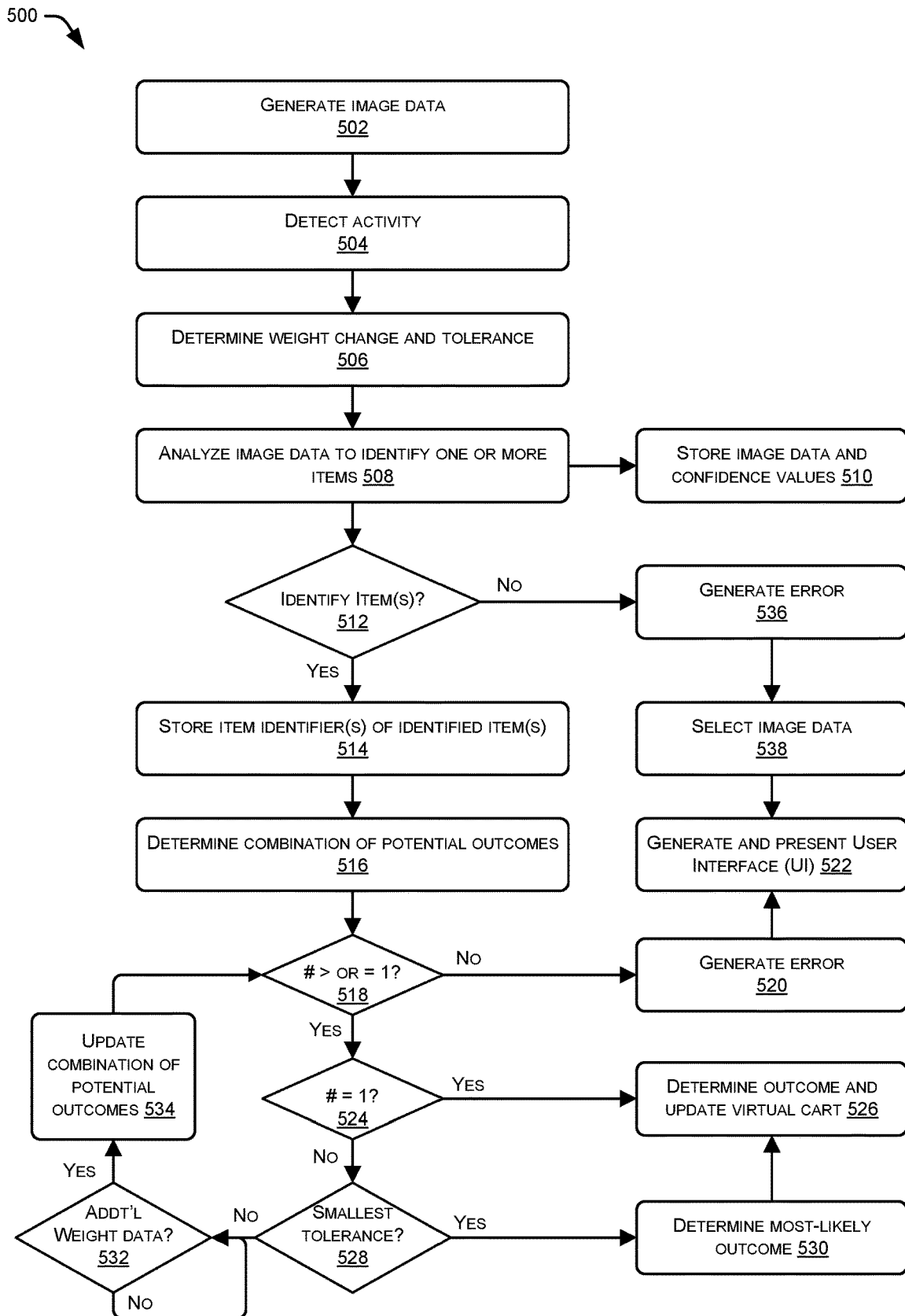
FIG. 5 illustrates a flow diagram of an example process for determining whether an outcome of an event can be determined and, if so, for updating a virtual cart of a user. If not, the process may generate a UI that includes image data of an item (identified or otherwise) and an indication that an error has occurred.

FIG. 5 illustrates a flow diagram of an example process 500 for determining whether an outcome of an event can be determined and, if so, for updating a virtual cart of a user. If not, the process may generate a UI that includes image data of an item (identified or otherwise) and an indication that an error has occurred. The process 500, and other processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In addition, these processes may be performed by a tote (e.g., cart, basket, bag, etc.), servers, other computing devices, or a combination thereof.

At an operation 502, one or more imaging devices 402 of the cart 102 may generate image data, while an operation 504 represents the activity-detection component 406 detecting predefined activity. At an operation 506, the weight-change component 418 may determine a weight change (e.g., a weight change of the basket of the cart) and a corresponding tolerance, such as number of grams around the weight change that is likely to include the real-world weight change experienced by the basket.

An operation 508 represents components of the cart 102 (e.g., the item-localization and item-identification components) analyzing the image data to attempt to identify one or more items. In addition, the item-localization component may store portion(s) of the image data and their corresponding confidence values at an operation 510, assuming the portions meeting one or more criteria. This image data may be used to generate and present one or more UIs, as described below. In addition to storing each respective frame (or portion of a frame) in association with its respective confidence value, this operation may include storing a timestamp indicating a time associated with the frame or portion of the frame.

An operation 512 represents determining whether one or more items have been identified in the image data. If so, then an operation 514 represents storing respective item identifiers of the identified items. For example, the item-identification component 410 may identify these items and store their respective item identifiers.

At an operation 516, the event-determination component 412 determines a bounded combination of potential outcomes of any event involving the identified item(s). In some instances, this may occur in response to the activity-detection component 406 determining that activity in the basket of the cart has ceased. Further, in some instances, this operation includes determining a weight-change range that the cart would experience based on the respective potential outcome, the weight(s) of the identified item(s), and the tolerance associated with the weight(s) of the identified item(s). For example, one possible outcome of "+1 can of soda" (that has a weight of 80 grams+/−5 grams) and "+1 jar of nuts" (that has a weight of 120 grams+/−10 grams) has a range of +185 grams (80 grams less 10 grams plus 120 grams less 10 grams) to +215 (80 grams plus 5 grams plus 120 grams plus 10 grams). In addition, this operation may include calculating a weight range using the weight-change data and tolerance reported by the weight-change component 418. In addition, the event-determination component 412 may determine which of the combination of generated possible outcomes may explain the weight data reported by the weight-change component 418. For example, the event-determination component 412 may determine which of the possible results is associated with a range that overlaps the weight range generated using the weight data determined by the weight-change component 418.

An operation 518 represents the event-determination component 412 determining whether the number of potential outcomes that explain the weight change reported by the weight-change component is greater than or equal to one. If not, meaning that none of the potential results explain (i.e., overlap with) the weight range determined by the weight-change component 418, then at an operation 520 the event-determination component 412 generates an error. Further, at an operation 522 the UI component 428 receives an indication of the error and, in response, generates and presents a UI indicating the error. This UI may include an image of the item (e.g., from an item catalog) and a request that the user help the cart determine the outcome of the result involving the identified item.

If, however, the event-determination component 412 determines that the number of possible outcomes is greater than or equal to one, then at an operation 524 the component 412 may determine whether the number of possible outcomes that explain the weight data is equal to one. If so, then at an operation 526 the event-determination component 412 determines the outcome as corresponding to the single possible outcome and causes a virtual cart of the user to be updated. For example, the component 412 may generate the event-description data 420, which may cause the virtual-cart management component 422 to generate the virtual-cart shopping data 424. In addition, the UI component 428 may generate and present a UI including the event-description data and/or additional data (e.g., an image of the item from the item catalog).

If, however, the event-determination component 412 determines that the number of possible outcomes is not equal to one, then the component 412 may determine, at an operation 528, whether the weight data reported by the weight-change component 418 is associated with a smallest tolerance, such as +/−1 gram, meaning that any subsequent data reported by the weight-change component 418 cannot have a smaller weight range and, thus, cannot rule out of any the multiple possible outcomes. If these instances, at an operation 530 the event-determination component 412 may determine the most-likely outcome from the pending possible outcomes and may generate corresponding event-description data. A discussion above describes one example operation of the event-determination component assigning scores to possible events for determining a most-likely event.

If the tolerance associated with the weight data from the weight-change component 418 is not the smallest tolerance, then an operation 532 represents determining whether additional weight data is received from the weight-change component 520. This operation continues until additional weight data is received or the activity-detection component 406 detects activity, in which case the process 500 may reset upon the activity-detection component 406 reporting a lack of activity (e.g., the component 406 changing its flag to false).

Upon receiving additional weight data, the event-determination component 412 may first ensure that the tolerance associated with this weight data is the same or less than the tolerance that the latest hypotheses have been based on. If not, then the event-determination component 412 may disregard the weight data. If so, then at an operation 534 the event-determination updates the combination of potential outcomes and again determines whether the number of possible outcomes is greater than or equal to one. This portion of the process may continue until a single possible outcome is determine, no possible outcome is determined, a most-likely possible outcome is determined based on smallest-tolerance weight data, or activity in the cart is re-detected. Further, and as noted above, in some instances, the process 500 may verify any result a threshold number of times (e.g., identify the result three times) before making a final determination and, when appropriate, generating the event-description data 420.

Returning to the operation 512, in some instances the item-identification component 410 is unable to identify the item. In response, an operation 536 represents generating an error. In response, an operation 538 may select image data generated by the cameras for inclusion in a UI for presentation to the user. For example, this operation may represent selecting one or more frames of image data having a highest confidence score from those frames stored in the memory and associated with respective timestamps within a time range associated with the event involving the unidentified item. The operation 522 represents generating the UI that includes the selected image data.

FIG. 6 illustrates a flow diagram of an example process 600 that the item-localization component 408 may perform for determining portions of image data to store for potential later use in UIs presented to a user operating a cart. At an operation 602, the item-localization component 408 may receive one or more frames of image data and, at an operation 604, may input the frame(s) into one or more trained localizers. The localizer(s) may have been trained using supervised learning to identify portions of frames that depict items.

At an operation 606, the item-localization component 408 determines whether an output is received. As noted above, when the trained localizer(s) identifies a portion of a frame that includes an item, the localizer(s) may output an indication of the portion (e.g., coordinates of a bounding box around the item) and a corresponding confidence level. If no output is received, then the process 600 returns to the operation 602. If an output is received, then at an operation 608 the item-localization component 408 determines whether more than one portion of the frame has been identified. If so, then at an operation 610 the item-localization component 408 selects a portion of the frame associated with a highest level and the process 600 to an operation 612. If not, then the process 600 proceeds directly to the operation 612.

At the operation 612, the item-localization component 408 determines whether the portion of the frame meets one or more confidence-level criteria, such as the confidence level being greater than a threshold. If not, then the process returns to the operation 602. If the confidence criteria is met, however, than at an operation 614 the item-localization component 408 determines whether the portion of the frame meets one or more size criteria, such as whether the size of the portion is less than (or greater than, in some instances) a threshold size. If not, then the process 600 returns to the operation 602. If so, then at an operation 616 the item-localization component 408 determines whether one or more time criteria is met, such as a threshold amount of time having elapsed since the item-localization component 408 stored a portion of a frame of image data. If not, then the process 600 returns to the operation 602. If so, however, then the item-localization component 408 may store the portion of the frame and its corresponding confidence value at an operation 618. This portion of the frame of image data may be stored in volatile memory in some instances, which may be later used by the UI component 428 for generating and presenting a UI to a user of the cart. After the storing, the process 600 may return to the operation 602.

Figure 7:
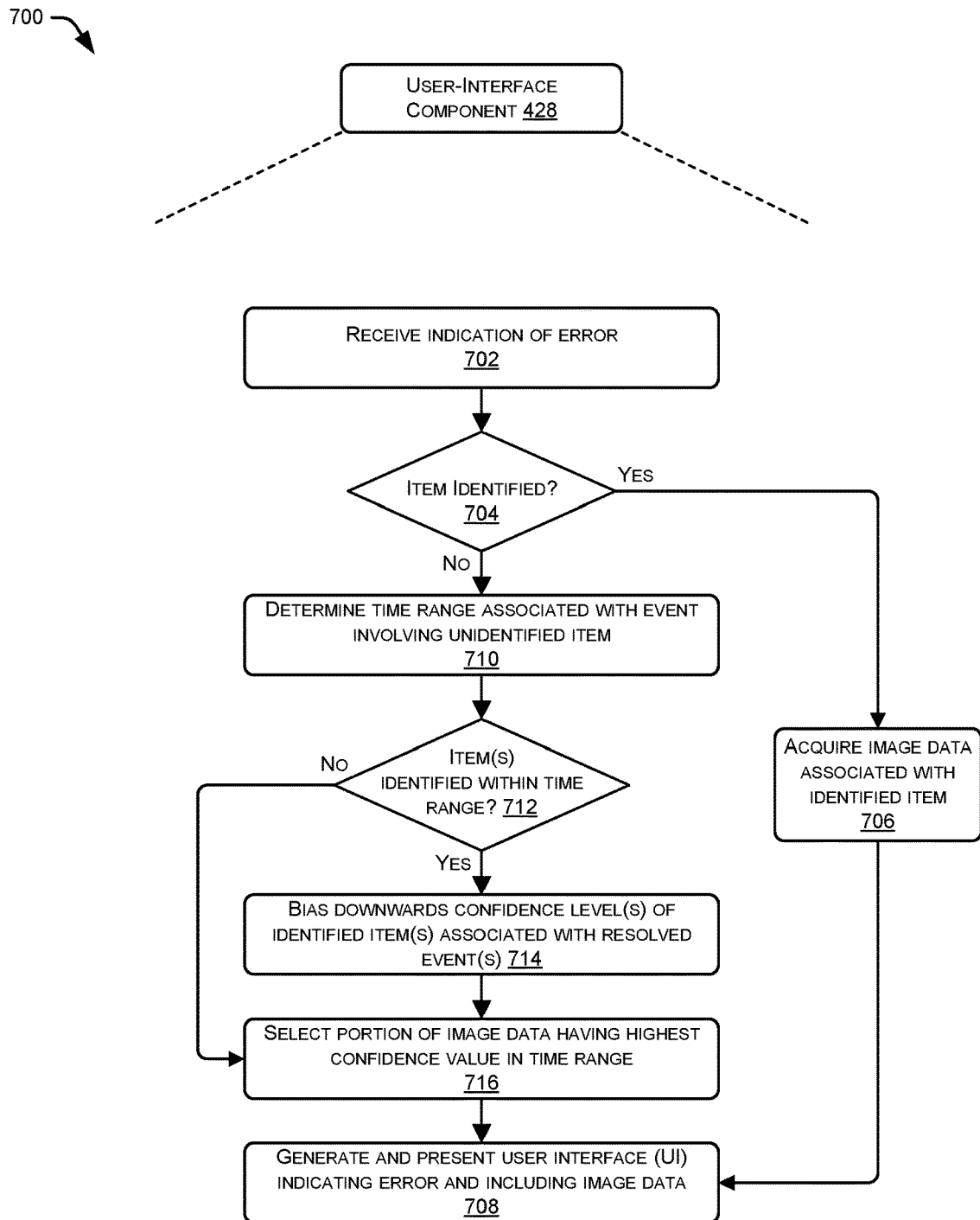
FIG. 7 illustrates a flow diagram of an example process that a user-interface component may perform for selecting which frame(s) of image data to include in a UI for presentation to a user.

FIG. 7 illustrates a flow diagram of an example process 700 that the UI component 428 may perform for selecting which frame(s) of image data to include in a UI for presentation to a user. At an operation 702, the UI component receives an indication of an error from the event-determination component 412. At an operation 704, the UI component 428 determines whether an item has been identified as part of the unresolved event. If so, then at an operation 706 the UI component 428 acquires image data associated with the identified item, such as image data from an item catalog or otherwise. At an operation 708, the UI component 428 generates and presents a UI indicating the error and the acquired image data.

If, however, the unresolved event is not associated with an identified item, then at an operation 710 the UI component 428 determines a time range associated with the event involving the unidentified item. In some instances, the event-determination component 412 determines this time range, while in other instances the component 412 determines a timestamp associated with the failure to identify the item or resolve the event and the UI component 428 determines a time range about this time. In either instance, at an operation 712 the UI component 428 determines whether any items have been successfully identified (e.g., by the item-identification component 410) within the defined time range. In some instances, the event-determination component 412 provides this information, such as in the form of providing a time associated with an identified item or a resolved event. If the UI component 428 determines that an item has been identified within the time range, then at an operation 714 the UI component 428 biases downwards confidence level(s) of the identified item(s) associated with the resolved event(s).

After doing so, or if no such items exist in the time range, then at an operation 718 the UI component 428 selects one or more portions of image data having a highest confidence value in the time range. At the operation, the UI component 428 generates and present the UI that includes the selected image data. By selecting the image data having the highest confidence value, the UI component 428 likely selects the "best" image of the unidentified item and increases the likelihood that a user will recognize the item and be able to aid the cart in identifying the item. Further, while this example describes selecting a single frame or portion of a frame for inclusion in the UI, in other instances the UI component 428 may generate and present a UI that includes multiple frames, such as multiple angles captured by multiple cameras, a video of the user placing or removing the item, and/or the like. Further, in some instances the frame of the image data showing a front face of the item (as determined by a trained classifier) may be output to the user, or may be used to determine the confidence level associated with the corresponding frames.

FIG. 8 illustrates an example UI 800 that the UI component 428 may present on a display of the item-identifying cart may present in response to failing to identify an item placed into the cart 102. As illustrated, the UI 800 may include one or more frames of image data 802 that the cart generated while a user placed the item into the cart. As described above, the image 802 included in the UI 802 may comprise the portion of a frame of image data (e.g., stored in the volatile memory) having the highest confidence level within the time range associated with the unresolved event.

In addition, the UI may include one or more controls 804 to enable the user to identify the item. For instance, the example UI 800 include a first control that is selectable to unable the user to manually enter an identifier (e.g., a PLU, etc.) associated with the item to identify the item, a second control to indicate that the item includes a barcode (thus enabling the user to scan the barcode across a camera of the cart 102), and/or a third control indicating that the item is a personal item. If the user selects the third control indicating that the item is a personal item, then the cart 102 may disregard the item.

FIG. 9 illustrates an example UI 900 that the display of the item-identifying cart 102 may present after presenting the UI 800 and after the user places a subsequent item into the cart. Here, for example, the UI 900 includes an indication 902 that the cart 102 determined that the user has placed one jar or peanuts into the cart. As illustrated, the indication 902 may include a name of the item, a cost of the item, an image of the item, a quantity of the item placed into the cart, and so forth. In addition, the UI 900 still includes the image 802, although in a smaller size. However, the portion of the UI 900 includes a control 904 surrounding the image that, when selected by the user, may cause the display to re-present the UI 800.

FIG. 10 illustrates an example UI 1000 that the display of the item-identifying cart may present in response to failing to identify an item removed from the cart. Again, the UI 1000 may include an image 1002 of the unidentified item, which may comprise a portion of frame (or multiple frames) of image data generated during a time range associated with the unresolved event and having a highest confidence level. In addition, given that the action was determined to be a removal from the cart 102 and given that the cart 102 stores current contents of the cart via the virtual-cart shopping data 424, the UI 1000 may include one or more controls 1004 for selecting which item indicated in the virtual-cart shopping data 424 the user may have removed. As illustrated, the controls may represent an icon corresponding to a best-guess of the cart 102 (here, the jar of nuts) and an icon corresponding to a personal item. Again, if the user selects the personal-item icon, the cart 102 may disregard the removal of the item.

FIG. 11 illustrates example components of one or more systems 1100 configured to support an inventory-management system that includes functionality to perform the techniques described herein. In some instances, the systems may comprise a tote (e.g., an item-identifying cart, basket, etc.), one or more computing devices within a facility, one or more computing devices that are remote from the facility, and/or a combination thereof. In some instances, the cart 102 discussed above may include some or all of the components described below with reference to the systems 1100.

The systems 1100 may include one or more hardware processors 1102 (processors) configured to execute one or more stored instructions. The processors 1102 may comprise one or more cores. The systems 1100 may include one or more input/output (I/O) interface(s) 1104 to allow the processor 1102 or other components to communicate with other devices. The I/O interfaces 1104 may comprise Inter-Integrated Circuit (I2C), Serial Peripheral Interface bus (SPI), Universal Serial Bus (USB) as promulgated by the USB Implementers Forum, and so forth. The I/O interfaces 1104 may allow the various modules/components to communicate with each other and/or control each other.

The systems 1100 may also include one or more communication interfaces 1106. The communication interfaces 1106 are configured to provide communications between devices, such as the tote, the server(s) 120, sensors, interface devices, routers, and so forth. The communication interfaces 1106 may include devices configured to couple to personal area networks (PANs), wired and wireless local area networks (LANs), wired and wireless wide area networks (WANs), and so forth. For example, the communication interfaces 1106 may include devices compatible with Ethernet, Wi-Fi™, Bluetooth®, and so forth. The systems 1100 may also include one or more busses or other internal communications hardware or software that allow for the transfer of data between the various modules and components.

The systems 1100, such as the tote, may also include one or more proximity sensors 1108, a camera (or other imaging devices 204), and one or more light sensors 1110. The proximity sensor(s) 1108 may comprise any type of sensor that is able to detect the presence of nearby objects without the need for physical contact (e.g., ToF sensors, PIR sensors, etc.). The cameras in each of the capture assemblies may comprise any type of camera or imaging device configured to generate image data (and/or video data), or information descriptive of a plurality of picture elements or pixels. The light source(s) (e.g., LEDs) 1110 may be selectively activated to emit light at any wavelength, visible or non-visible to users.

The systems 1100 may include one or more power supply(ies) 1112 to provide power to the components. The power supply(ies) 1112 may also include a secondary (e.g., internal) power supply to allow for hot swapping of battery pack modules, such as one or more capacitors, internal batteries, etc.

The systems 1100, such as the tote, may also include a display 1114 configured to display image data, such as pictures, videos, user interface elements, and/or any other image data. The display 1114 may comprise any type of display 1114 and may further be a touch screen to receive touch input from a user. The tote may also include one or more microphones 1116 and one or more loudspeakers to facilitate a dialogue with a user, and/or to receive feedback from the user. The microphone(s) 1116 may capture sound representing the user's speech, and the loudspeaker(s) may output machine-generated words to facilitate a dialogue, prompt a user for feedback on an item and/or for other information, and/or output other alerts or notifications. The systems 1100 may further includes one or more light sensors 1118 and one or more RF receivers 1120, as discussed below, potentially in addition to one or more other sensors and/or output components. The systems 1100 may also include one or more weight sensors 414, such as weight sensors 414 coupled to basket of the tote for measuring weight data of items placed into or removed from the tote. This weight data may be used to identify the items placed into or removed from the tote.

The systems 1100 may include one or more memories 1122 (e.g., in an electronics box module along with the processor(s) 1102). The memory 1122 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1122 provides storage of computer-readable instructions, data structures, program modules, and other data for the operation of the systems 1100. A few example functional modules are shown stored in the memory 1122, although the same functionality may alternatively be implemented in hardware, firmware, or as a system on a chip (SOC).

The memory 1122 may include at least one operating system (OS) component 1124. The OS component 1124 is configured to manage hardware resource devices such as the I/O interfaces 1104, the communication interfaces 1106, and provide various services to applications or components executing on the processors 1102. The OS component 1124 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 1122. These components may be executed as foreground applications, background tasks, daemons, and so forth. A communication component 1126 may be configured to establish communications with one or more of the sensors, one or more of the servers, or other devices. The communications may be authenticated, encrypted, and so forth.

The memory 1122 may further store the inventory-management system 1128. The inventory-management system 1128 is configured, in part, to provide the item-identifying functions (and other functions) provided by the tote as described herein. For example, the inventory-management system 1128 may be detect items, identify items, and maintain a virtual item listing for a user of the tote.

The inventory-management system 1128 may include a user-activation component 1130 that performs operations for activating a shopping session using a tote on behalf of a user. For instance, a user may have previously registered for a user account with an operator of the facility to utilize various automated management services provided by an operator of the facility. The user may have registered for a user account, such as by providing user data 1132, to automate payments made for items taken by the user and included a payment means (e.g., credit card, bank account number, etc.), and may have also provided an identification means in the user data 1132 to the user-activation component 1130 such that the tote can recognize the user. For instance, the user may have registered to identify themselves to the tote using any identification technique by the user-activation component 1130, such as by providing user data 1132 by presenting an identification means to a camera/scanner 204 (e.g., presenting a driver's license, presenting a facility-issued card, presenting a user identifier via a mobile phone, etc.), speaking a predefined utterance that is captured by the microphone(s) 1116 (e.g., a name of the user, a predefined keyword, etc.), and/or looking into a camera 402 for facial recognition (upon explicit request from the user). Once a user has identified themselves to using the user-activation component 1130, the user-activation component 1130 may open a shopping session where the tote identifies and track items retrieved by the user and placed in the tote.

The inventory-management system 1128 may additionally include an activity-detection component 406 configured to detect items (or objects) within a particular proximity to the tote. For example, one or more proximity sensor(s) 1108 may generate sensor data 1134 that indicates a distance between the proximity sensor(s) 1108 and any objects located in the FOV of the proximity sensor(s) 1108. The activity-detection component 406 may analyze the sensor data 1134 and determine if an object is within a threshold distance indicating that the object is near the tote and/or within or near the perimeter of the top of the tote (e.g., one foot from the proximity sensor(s) 1108, two feet from the proximity sensor(s) 1108, etc.). In this way, the proximity sensor(s) 1108 may generate sensor data 1134 that indicates whether or not an item is being moved in or out of the tote. However, in some examples, rather than using sensor data 1134 generated by a proximity sensor(s) 1108, the activity detection component 406 may utilize image data 404/426 generated by the camera(s) 402 to determine if an object is within a threshold distance from the tote.

The inventory-management system 1128 may further include a strobing component configured to cause the LED(s) 1110 and/or shutters of the camera(s) 402 to strobe according to different frequencies. The LED(s) 1110 may emit light in any light spectrum (e.g., infrared, near infrared, visible, etc.). However, some items may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the LED(s) 1110 to emit light in the visible spectrum. When generating image data 404/426 using camera(s) 402, motion blur may appear when capturing fact moving objects. However, the motion blur may be reduced or eliminated by exposing the camera(s) 402 imager for a short (e.g., sub-millisecond) durations. Accordingly, the strobing component may strobe the opening and closing of shutters of the camera(s) 402 to limit the sensor exposure duration.

Additionally, the strobing component may cause the LEDs to emit/strobe light at a particular frequency.

In some examples, the image data 404/426 may include 2D representations of the items, and/or 3D representations of the items. For instance, the imaging device(s) 402 may include 3D imaging devices or cameras that generate 3D models or representations of the items that are placed in, or removed from, the tote. Thus, the image data may include 2D representations and/or 3D representations of the items that may be utilized to identify the items as described herein.

The inventory-management system 1128 may also include the weight-change component 418, the item-localization component 408, the item-identification component 410, the event-determine component 412, the virtual-cart management component 422, and the UI component 428. Operation of these components is described in detail above.

In some examples, the memory includes one or more data stores 1136 for storing the data described herein. For example, the data store(s) 1136 may include physical-layout data 1138, which may be used, in part, in some instances by the item-identification component 410 to determine the item. The physical-layout data 1138 may include or provide a mapping of physical locations within the physical layout of devices and objects such that the location of the tote may be utilized to determine an item stored nearby. The physical-layout data 1138 may indicate the coordinates within the facility of an inventory location, items stored at that inventory location, and so forth. In examples where the tote has location determining sensors (e.g., GPS, RFID, proximity, etc.), the location sensor data may be used to determine where in the store the user is. In such examples, the item-identification component 410 may access the physical-layout data 1138 to determine if a location associated with the event is associated with items, and confidence levels for the corresponding representations of items in the item data 1140. Continuing the example above, given the location within the facility of the event and image camera data, the physical-layout data 1138 may determine the items that may have been represented in generated images of the event 106.

The inventory-management system 1128 may further include an event-determination component 412 to determine event-description data 420 for the item in the image data 404/426. The event-determination component 412 may determine if the user is adding an item to the tote, removing the item from the tote, etc., based on movement of the item and/or whether the item is shown in the image data 404/426. For instance, if the item is shown as being moved downward towards the interior of the tote, and the user's hand then leaves the tote without the item, it can be determined that the user added the item to the tote. Similarly, if the user's hand moves into the tote without an item and is depicted in the image data 404/426 taking an item from the tote, the event-determination component 412 may determine that the user removed an item from the tote. In some examples, the event-determination component 412 may analyze a trajectory of the hand of the user to determine, using two or more images representing the hand over time, whether the trajectory of the item is moving into the tote, or out of the tote.

The inventory-management system 1128 may also include a virtual-tote management component 422 configured to manage virtual item listing data (or virtual-cart shopping data 424) for the systems 1100. For instance, the virtual-tote management component 422 may utilize the item data 1140, event-description data 420, and confidence level data 1142 to add item identifier(s) 1144 to the virtual item listing data 424 for items that were added to the tote, remove item identifier(s) 1144 from the virtual item listing data 424 for items that were removed from the tote, and track item quantity data 1146 indicating quantities of particular items in the tote.

The inventory-management system 1128 may further include a user-interface component 428 configured to present user interfaces on the display 1114 based on user-interface data 430. The user interfaces 430 may include one or more fields to present data, and/or receive touch input (or other input via a keyboard, mouse, etc.) from a user. For instance, if the item-identification component 212 is unable to determine an item identifier 1144 for an item shown in the image data 404/426, the user-interface component 428 may receive inquiry data 1148 generated by an inquiry component 1150 to prompt a user or a human associate at the facility for feedback to help identify the item, and/or other information (e.g., if multiple items were placed in the tote). The inquiry component 1150 may be configured to generate inquiry data 1148 based on the information needed to identify the item. For instance, the inquiry data 1148 may include a prompt to request particular feedback from the user or the associate, such as to provide input (e.g., touch input, vocal/utterance input, etc.) to identify the item, input to indicate how many items were added to the tote, input to indicate whether an item was removed or added, etc. In some examples, the user-interface component 428 may present one or more images depicting items from the item data 1140 that have the highest confidence levels as corresponding to the item in the image data 1140, but confidence levels that are not high enough to make a final decision as to the item. For instance, the user-interface component 428 may present pictures of two different items that have high confidence levels 1142 and request that the user select or indicate the appropriate item. Additionally, or alternatively, the user-interface component 428 may present user-interface data 430 that prompts the user for feedback regarding whether or not the item was added to, or removed from, the tote. Responses from a user operating the tote may be stored as response data 1154.

In some examples, the inventory-management system 1128 may further include a locating component 1152 configured to determine locations of the tote in the facility. For instance, the locating component 1152 may analyze sensor data 1134 collected by sensors of the tote to determine a location. In some examples, the communication interface(s) 1106 may include network interfaces that configured the tote to receive or detect wireless signals (e.g., WiFi signals, Bluetooth signals, etc.) and generate sensor data 1134 indicative of the signals. The locating component 1152 may analyze the sensor data 1134 using various techniques to identify the location of the tote, such as WiFi triangulation, received signal strength indicators (RSSI), and/or other methods for analyzing wireless signals to determine a location of the tote. In some instances, the facility may include various infrared (IR) or near-IR emitters at different locations that emit light according to frequencies, patterns, etc. that indicate the different locations in the facility. In such examples, the tote may utilize a light sensor 1118 to generate the sensor data 1134 representing the IR or NIR and determine the location of the tote in the facility. In some instances, there may be visible landmarks or markers throughout the facility that indicate a location in the facility, and the locating component 1152 may analyze image data 404/426 generated by an outward facing camera to determine a location of the tote. As another example, there may be various radio frequency (RF) emitters positioned throughout the store, and the tote may utilize the RF receiver 1120 to allow the locating component 1152 to perform RF beaconing to determine the location of the tote. The locating component 1152 may perform one, or any combination, of the above techniques to determine a location of the tote in the facility and/or any other technique known in the art.

The locating component 1152 may perform various operations based on determining the location of the tote within the facility. For instance, the locating component 1152 may cause user interface data 420 to be presented on the display 1114 that includes a map of the facility and/or directions to an item for the user of the tote. Additionally, or alternatively, the locating component 1152 may utilize the location of the tote, the physical-layout data 456, and/or item data 1140 and "push" user interfaces to the display 1114 that indicate various location-based information, such as indications of deals for items located nearby, indications of items located nearby and on the user's shopping list, and/or other user interface data 420.

In instances where the components of the system(s) 1100 reside on a tote, a user operating the tote may move the tote around the facility to one or more inventory locations. The user may retrieve items from the inventory location and place the items in the tote. Additionally, the user may retrieve items from the tote and put the items back in an inventory location, such as when the user changes their mind regarding their desire to purchase or otherwise acquire the item. The components described above may function to identify item identifiers corresponding to the items placed in the tote and maintaining a virtual item listing for the shopping session of the user.

In some instances, the facility may also include various sensors configured to interact with the tote and/or generate sensor data in addition to, or as an alternative to, the sensor data generated by the tote. For instance, the facility may include one or more access points configured to emit signals (e.g. WiFi, Bluetooth Beacons, etc.) that are detected by the tote for use in determining the location of the tote in the facility. Further, the facility may include one or more camera(s) 116 configured to generate image data that depicts the facility, such as the events 110 occurring in the facility, items involved in the events, and/or users that selected the items. Further, the facility may include one or more weight sensors disposed in the inventory locations to detect generate sensor data indicative of the removal of, or return of, items from the inventory locations. The facility may include one or more backend devices or servers, and/or may transmit the data to the servers at a remote location, for analysis using the techniques described herein. That is, the techniques described herein may be performed entirely by the tote using sensor data and image data generated by sensors of the tote, entirely by backend devices/servers of the facility (or remote servers) using sensor data and image data generated by the tote, entirely by backend devices/servers of the facility (or remote servers) using sensor data and image data generated by sensors in the facility, and/or any combination thereof.

As a user shops using a tote as described herein, the tote may cause a virtual cart associated with the user to be updated. For example, an item identifier may be determined and stored in association with the virtual cart. It is to be appreciated that the item identifier may comprise a name of the item, a numerical identifier of the item, and/or, in some instances, the string of characters corresponding to the barcode of the item. Stated otherwise, determining the item identifier may comprise determining the string of the barcode or determining a different identifier associated with the string of the barcode.

Once the user has finished their shopping session, the user may end the shopping session in various ways. For instance, the user may return the tote to a tote corral or other storage location, provide input to the tote indicating an end of the shopping session (e.g., utterance, utilize a user interface element on a touch display, etc.), or simply remove item bags or other item carriers from the tote and leave the facility. After the user has ended their shopping session, the virtual listing of item IDs in the virtual item listing may be uploaded to one or more remote servers, over one or more networks, that manage user accounts for users of the facility. The server(s) 120 may charge the appropriate user account for the items in the virtual listing that the user took from the facility. For instance, the server(s) may be configured to determine or generate information indicative of a cost of the items picked by the user, including the appropriate tax. Additionally, the server(s) may store payment information (e.g., credit card information, bank account information, etc.) for each user account. In this way, when the user finished their shopping session and the tote sends the listing of item IDs over the network(s) to the server(s), the server(s) may be configured to determine a cost or price for all of the listed item IDs and charge the user via their payment information for the items selected during their shopping session. In this way, the user need not go through steps of a traditional check-out experience (e.g., waiting in line for a cashier, scanning items with the cashier, paying for items at the cashier, etc.).

The network(s) may include private networks such as an institutional or personal intranet, public networks such as the Internet, or a combination thereof. The network(s) may utilize wired technologies (e.g., wires, fiber optic cable, and so forth), wireless technologies (e.g., radio frequency, infrared, acoustic, optical, and so forth), or other connection technologies. The network(s) is representative of any type of communication network, including one or more of data networks or voice networks. The network(s) may be implemented using wired infrastructure (e.g., copper cable, fiber optic cable, and so forth), a wireless infrastructure (e.g., cellular, microwave, satellite, etc.), or other connection technologies.

The tote may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 122 according to the type of protocol or standard being used. As noted above, in some examples, the servers may perform some or all of the operations described below as being performed by the tote. While the servers are illustrated as being in a location outside of the facility, in other implementations, at least a portion of the servers may be located at the facility.

As illustrated, the cart 102 may generally include or be formed of a frame 1202, a basket 1204, a first handle 1206(1) for pushing the cart 102, a second handle 1206(2) for pulling the cart, a wheel frame 1, and one or more wheel castors 1210 to enable movement of the cart 102 on a surface. The frame 1202, the basket 1204, the handles 1206, and the wheel frame 1 may be formed from any suitable materials such as plastics, wood, metals, composites or any other combinations of materials. Moreover, frame 1202, the basket 1204, the handle 1206, and the wheel frame 1 may take any form.

The basket 1204 may generally be part of the frame 1202 and/or supported by the frame 1202 (e.g., be welded, fused, adhered, bolted, screwed, molded, or otherwise joined to the frame 1202). In some examples, the basket 1204 may comprise a grid or lattice-like structure (e.g., a honeycombed arrangement or framework) having one or more bars or members that are welded, fused, adhered, bolted, screwed, molded, stitched or otherwise joined in a substantially perpendicular alignment with respect to one another. The basket 1204 may generally be any shape that defines an interior cavity, or receptacle, for receiving items 104 that are placed in the cart 102. The basket 1204 may comprise a bottom, multiple sides protruding from the bottom, and a top. As illustrated, the bottom basket 1204 may be in the shape of a quadrilateral such that there are four sides protruding from the bottom of the basket 1204. Similarly, the top of the basket 1204 may be defined according to the quadrilateral shape and have a perimeter with four corners. The perimeter of the top of the basket 1204 may define an opening to the interior cavity (or receptacle) of the basket 1204 to receive items placed inside the basket 1204. In various examples, the perimeter of the top of the basket may be disposed in a substantially horizontal plane (e.g., a plane substantially along the x-axis as illustrated), and the frame 1202 may include at least one vertical member that extends downward from the basket 1204 to the wheel frame 1 along a substantially vertical plane (e.g., a plane substantially along the y-axis as illustrated).

The wheel frame 1 may support one or more wheel castors 1210 to enable movement of the cart 102 along a surface. The wheel castors 1210 include one or more wheels, axles, forks, joints or other components which enable the cart 102 to travel on various surfaces. For example, in some implementations each of the wheel castors 1210 may include a single wheel provided on an axle within a fork, or two or more wheels provided on such an axle. In some other implementations, the wheel castors 1210 may include two or more axles. Alternatively, in still other implementations, a single caster may be provided in lieu of the multiple wheel castors 1210. In accordance with the present disclosure, the wheel castors 1210 may operate in any manner, such as being configured to pivot or swivel, and thus automatically adjust or align with a direction of travel. In some examples, the cart 102 may be equipped with other apparatuses for enabling the cart 102 to travel on solid surfaces, including one or more wheeled components other than casters, including but not limited to omnidirectional wheels, spherical wheels or other like apparatuses. Additionally, in some other implementations, the cart 102 may include two or more skis or other runners for traveling on smooth surfaces. In still other implementations, the cart 102 may be levitated, e.g., by magnetic levitation through the use of one or more linear induction motors. Moreover, the cart 102 may be propelled or pushed by humans or autonomous mobile robots or, alternatively, by one or more motors (e.g., electric-powered or gasoline-powered).

As illustrated, the cart 102 may include a first imaging device 402(1), for identifying a user operating the cart as described above, and additional, second imaging devices 402(2), 402(3), 402(4) . . . , 402(N) that include components for use in identifying items placed in the basket 1204 and removed from the basket 1204. The imaging device 402(1) may, in some instances, be positioned in a manner such that an FOV of the imaging device 402(1) is away from the basket 1204 and substantially towards the first handle 1206(1) where a user may typically operate the cart 102. The imaging devices 402(2)-(N) may be positioned at any location on the cart 102 (e.g., in the basket 1204, on the basket 1204, mounted to the frame 1202, mounted to the basket 1204, and/or any other location), oriented to have respective FOVs for identifying events that occur within and proximate to the basket 1204. In some examples, the cart 102 may include at least four of the second imaging devices 402(1), 402(2), 402(3), and 402(N) that are disposed or coupled proximate to four corners of the top of the basket 1204. In some examples, one or all of the components of the second imaging devices may be disposed internal to the form factor of the basket 1204 and/or frame 1202, at least partially internal to the form factor of the basket 1204 and/or frame 1202, and/or entirely external to the form factor of the basket 1204 and/or frame 1202 (e.g., mounted to the cart 102). However, in the illustrated example, the second imaging devices may be disposed at locations proximate to the four corners of the top or perimeter of the basket 1204/frame 1202. In some instances, the less that the second imaging devices protrude from the form factor of the cart 102, the more efficiently the carts 102 may be nested with respect to each other.

As described in further detail below with respect to FIG. 12B, the cart 102 may further include one or more one light sources (e.g., LEDs) for emitting light at or prior to the time of the second imaging devices generating the second image data. The cart 102 may further include, in some instances, one or more proximity sensors (e.g., ToF sensor, PIR sensor, etc.). In some examples the proximity sensors may be activated to detect the proximity of items 104 or other objects above the top of the basket 1204. The proximity sensors may be configured to generate sensor data that indicates distances between objects above the top of the basket 1204 of the cart 102 and the second imaging devices. The cart 102 may include components configured to analyze the sensor data and determine that an item 104 is within some threshold distance from the top of the basket 1204 and/or within the basket 1204. Upon detecting an object within the threshold proximity of the basket 1204 using the proximity sensor, one or more components of the cart 102 may cause the light sources (LEDs) to emit light and the second imaging devices to generate image data. In some examples, the FOVs of the second imaging devices 402(2)-(N) may each at least partially overlap at a location above the top of the basket 1204 corresponding to a centroid of the quadrilateral defining the top of the basket 1204. The light sources may illuminate the basket 1204 and/or the area above the top of the basket 1204 to illuminate items 104 being placed in the cart 102, or removed from the cart 102, to act as a "flash" for the cameras that are generating image data. The second imaging devices may generate image data for a predefined period of time and/or until the proximity sensors (or the image data itself) indicates that there is no longer an object within the threshold distance from the cart 102 or top of the cart 102.

After generating the image data, one or more components of the cart 102 may process the image data to determine an item identifier for the item(s) 106 represented in the image data, and an event 106 for the image data (e.g., addition of an item 104 to the cart, removal of an item 104 from the cart). In some instances, the cart 102 may include component(s) to determine an item 104 identifier for the item 104 (e.g., name of the item 104, SKU number for the item 104, etc.), and determine if the item 104 is being taken from the cart 102, or added to the cart 102, based on the motion of the item 104 and the result of the movement around the cart 102 once movement is no longer detected and represented by the image data. In other instances, the image data may be analyzed to identify the item, while the weight data may be analyzed as described above and below for determining the event associated with the item.

In either of these instances, the components of the cart 102 may then update a virtual shopping cart associated with the cart 102 that indicates a virtual listing of items 104 taken by the user from the facility based on the determined event 106. In some examples, the image data may be transmitted to the server(s) over the network(s) where the processing may be performed.

In various examples, the cart 102 may include a display 1114 to present various information in user interface(s) for the user to consume. In some examples, the display 1114 may comprise a touch screen to receive input from the user (e.g., a selection of an item identifier to disambiguate amongst potential item identifiers). In some instances, the display 1114 may present customized information to the user upon identifying the user, such as a shopping list of the user or the like. Further, the display 1114 may be used to provide feedback to the user when one or more items have been identified and to update a virtual shopping cart of the user when one or more event(s) associated with these items have been determined. The display may also be used to indicate when components of the cart 102 are unable to identify an item or resolve an event associated with an item. In these instances, the display may present a request that a user perform some action, such as input on the display a result of the event, hold the item(s) in front of the imaging devices 402, or the like.

The cart 102 may further include a battery pack module that houses one or more batteries to power the components of the cart 102. The battery pack module may include rechargeable batteries. In some examples, the battery pack module may be detachably coupled to the wheel frame 1 and/or the frame 1202 of the cart 102 such that the battery pack module may be removed and taken to a charging station. In various examples, the battery pack module may include rechargeable batteries that may be charged when the cart 102 is placed in a cart corral (e.g., through electrical contacts, power cords, etc.). In various examples, the frame 1202 and/or basket 1204 may have one or more channels (e.g., grooves, holes, paths, tunnels, etc.) through which power cables/cords may pass. In this way, power cables may be run at least partially through the channels in the frame 1202 and/or basket 1204 inconspicuously to provide power to the various components of the cart 102.

In some instances, the cart 102 may further include one or more lighting elements 1214 disposed on the frame 1202 and/or basket 1204 of the cart 102. The user may, in some instances, operate a controller to turn on (and off) the lighting element(s) 1214 to cause the lighting element(s) to emit light. Further, in some instances the controller may enable the lighting element(s) 1214 to transition between multiple light states, such as different colors, flashing effects, and/or the like. The controller operable by the user may comprise functionality accessible to the user via the display (e.g., one or more soft buttons for turning on and/or off the light), a physical toggle switch on the frame 1202 of the cart 102, and/or the light. Further, the lighting element(s) 1214 may be used to signal a predefined state of the cart 102 and/or the user. For example, the user may turn on the lighting element(s) 1214 to indicate that he or she requests assistance from an associate of the facility, or for any other reason. In some instances, in response to the user operating a controller to request assistance, the cart 102 may perform one or more actions in addition to turning on the lighting element(s) 1214. For example, the display may present content responding to this request, such as an offer to connect the user with an associate of the store (e.g., in person, via I/O devices of the cart, etc.). For example, in response to requesting assistance, the cart 102 may facilitate an audio-only or an audio/video call between the user and an associate of the facility using one or more I/O devices on the cart, such as the display, one or more speakers, one or more microphones, one or more cameras pointed toward the user and/or the like.

In still other instances, associates of the facility may, remotely or otherwise, operate the lighting element(s) 1214 to change states (e.g., turn on or off) and/or the cart 102 may include components to automatically change a state of the lighting element(s) 1214. For example, upon the card identifying that an item of a predefined class of items has entered the basket, the cart 102 may cause the lighting element(s) 1214 to change state (e.g., from an off state to an on state) to indicate that an additional checkout workflow may now be required. For example, if the user places an item into the basket 1204 that requires the purchasing user to be of a certain age (e.g., alcohol) or to have a certain prescription (e.g., medicine), the cart 102 may illuminate the lighting element(s). In some instances, the cart 102 may include a lighting element on a right side of the frame, a lighting element on a left side of the frame, and/or one or more other lighting elements in other locations on the cart 102. In still other instances, the lighting element(s) 1214 may be illuminated to provide feedback to the user operating the cart. For example, the lighting element may be instructed to illuminate green in response to the cart identifying an item and orange in response to the cart failing to identify an item or resolve an event associated with an identified item.

Figure 12A:
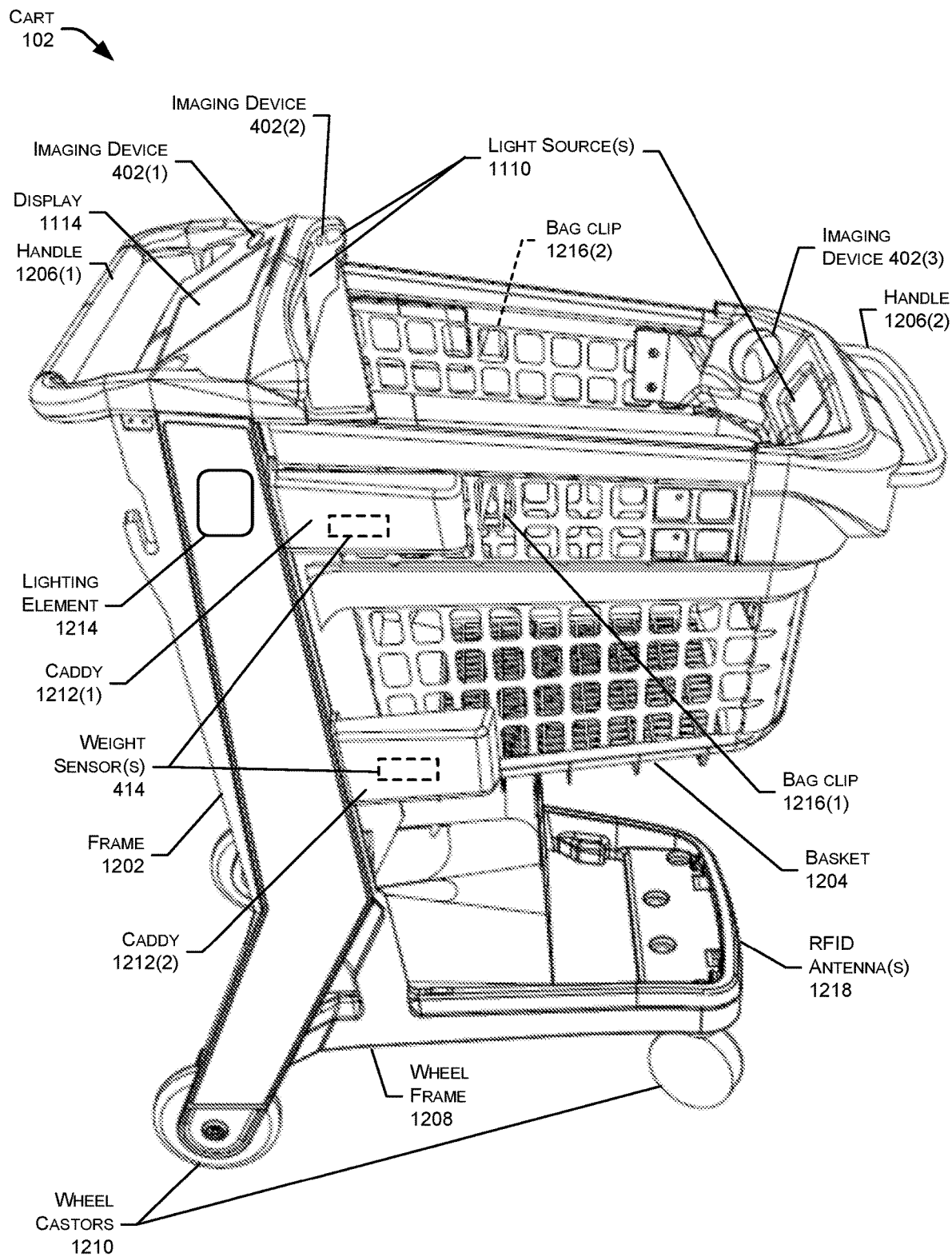
FIG. 12A illustrates a perspective view of an item-identifying cart that may be configured to identify items placed therein (e.g., using image data generated by one or more cameras mounted to the cart) and, thereafter, to determine the outcome of events involving the identified items (e.g., using one or more weight sensors mounted to a frame of the cart).

FIG. 12A further illustrates that the cart may include the first imaging device 402(1) for identifying a user, the one or more second imaging devices 402(2)-(N) for identifying items placed into or removed from the basket 1204, the display 1114 for presenting information to a user operating the cart 102, and the one or more lighting elements 1214. In addition, the cart 102 may include one or more light sources 1110 that function to emit light prior to and/or while the second imaging devices 402(2)-(N) generate the second image data for identifying items placed into and removed from the basket 1204. In some instances, these light sources 1110 emit constant light, while in other instances the light sources 1110 emit light in a strobing manner. In either of these instances, the light may be visible and/or non-visible light.

In addition, the cart may include one or more caddies, such as a caddy 1212(1) and a caddy 1212(2), coupled to the left and/or right side of the frame or basket of the cart 102. For example, the cart 102 may include the first and second caddies 1212(1) and 1212(2) on the right side of the cart, and two similarly situated caddies on the left side of the cart (not shown). Each caddy may define a receptacle (e.g., having an opening at the top) for housing one or more items therein. In some instances, the caddies may be beyond the FOV of the second imaging devices 402(2)-(N) such that the user is able to place personal items (e.g., keys, wallet, phone, etc.) into the receptacle defined by the respective caddy without the imaging devices 402(2)-(N) generating image data corresponding to this addition. In other instances, the caddies may be within the FOV of one or more of the imaging devices.

In addition, one or more of the caddies may include one or more respective weight sensors 414 for determining a current weight of the basket 1204 and, thus, items in the basket 1204. For example, each caddy may comprise a respective weight sensor 414 comprising a strain gauge or other sensor that continuously or periodically may be used to determine a weight of the basket and/or whether a change in weight has occurred. As illustrated, the cart 102 may include two weight sensors 414 on each side of the basket 1204. Each pair of weight sensors 414 may, in some instances, reside along the same vertical axis. That is, a top weight sensor on the right side of the basket 1204 may reside above a bottom weight sensor on the right side.

This weight data may be used to identify when items have been placed into or removed from the basket and, in some instances, may be used to identify items placed into or removed from the basket. For example, the weight data may be used to determine the identity of an item placed into or removed from the basket (e.g., to identify that a bottle of ketchup was placed into the basket), identify a number of instances of an item (e.g., a number of bottles of ketchup placed into the basket), to measure an amount of something (e.g. 1 pound of peanuts), and/or the like.

FIG. 12A further illustrates that the cart 102 may include one or more bag clips, such as a bag clip 1216(1) on a right side of the basket 1204 and a bag clip 1216(2) on a left side of the basket 1204. As illustrated, the bag clips 1216 may reside on an outside, top portion of the basket such that a user may place a bag into the interior of the basket while securing a first strap of the bag to the first clip 1216(1) and a second strap of the bag to the second clip 1216(2). Thereafter, the user may place items into and/or remove items from the bag. At the end of the shopping session, the user may remove the bag containing the items from the basket (e.g., by removing the straps from the clips) and exit the facility.

FIG. 12A further illustrates that the cart 102 may include one or more RFID antenna(s) 1218, which may be used for determining a location of the cart 102 within the facility. In some instances, the inventory locations may include respective RFID tags that may be read by the RFID antennas 1218 of the cart. In some instances, the cart 102, or a remote system communicatively coupled to the cart 102, may store map data that indicates associations between respective location with the facility to respective RFID tags throughout the facility. As illustrated, in some instances the RFID antennas 1218 may reside near a bottom portion of the frame of the cart. In other instances, however, the RFID antennas 1218 may reside at other locations on the cart 102 and/or distributed at multiple locations on the cart 102.

Figure 12B:
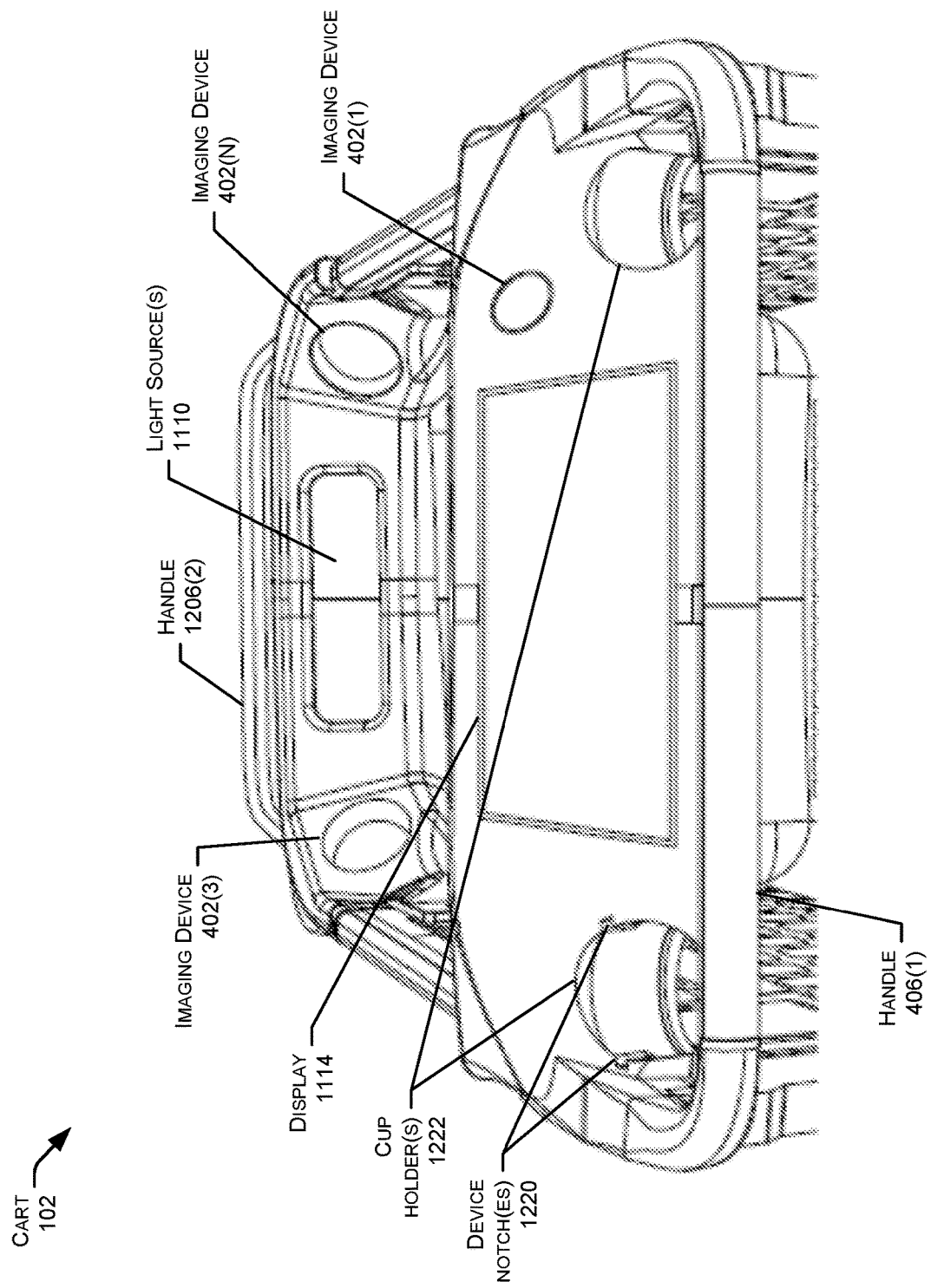
FIG. 12B illustrates a front view of the example item-identifying cart of FIG. 12A. As illustrated, the cart may include a display, which may be used to provide feedback to a user operating the cart.

FIG. 12B illustrates an example front view of the cart 102. As illustrated, the cart includes the first handle 1206(1) for pushing the cart 102, the second handle 1206(2) for pulling the cart 102, the imaging device 402(1) for generating data for identifying a user operating the cart, the second imaging devices 402(2)-(N), and the display 1114 to present content to the user operating the cart. The front view also illustrates that the cart may include the light source(s) 1110 between the imaging device 402(3) and 402(N). In some instances, the cart may further include a light source to the left of the imaging device 402(3) and/or a light source to the right of the imaging device 402(N).

In addition, the cart 102 may include one or more cup holders 1222 (in this example, on the left and right sides of the display 1114) for holding respective cups of the user. In addition, each cup holder may include one or more device notches 1220, comprising recesses of the cup holder in which a user may secure a device, such as a mobile phone or the like. That is, the device notches 1220 may provide respective slots in which a user may place an electronic device, such as a phone, in a manner in which the device is secure while a display of the device is oriented towards the user operating the cart. Thus, the user, may engage in the shopping session while having a shopping list or the like displayed on a device that sits securely in the device notches 1220 of the cup holder 1222.

Figure 12C:
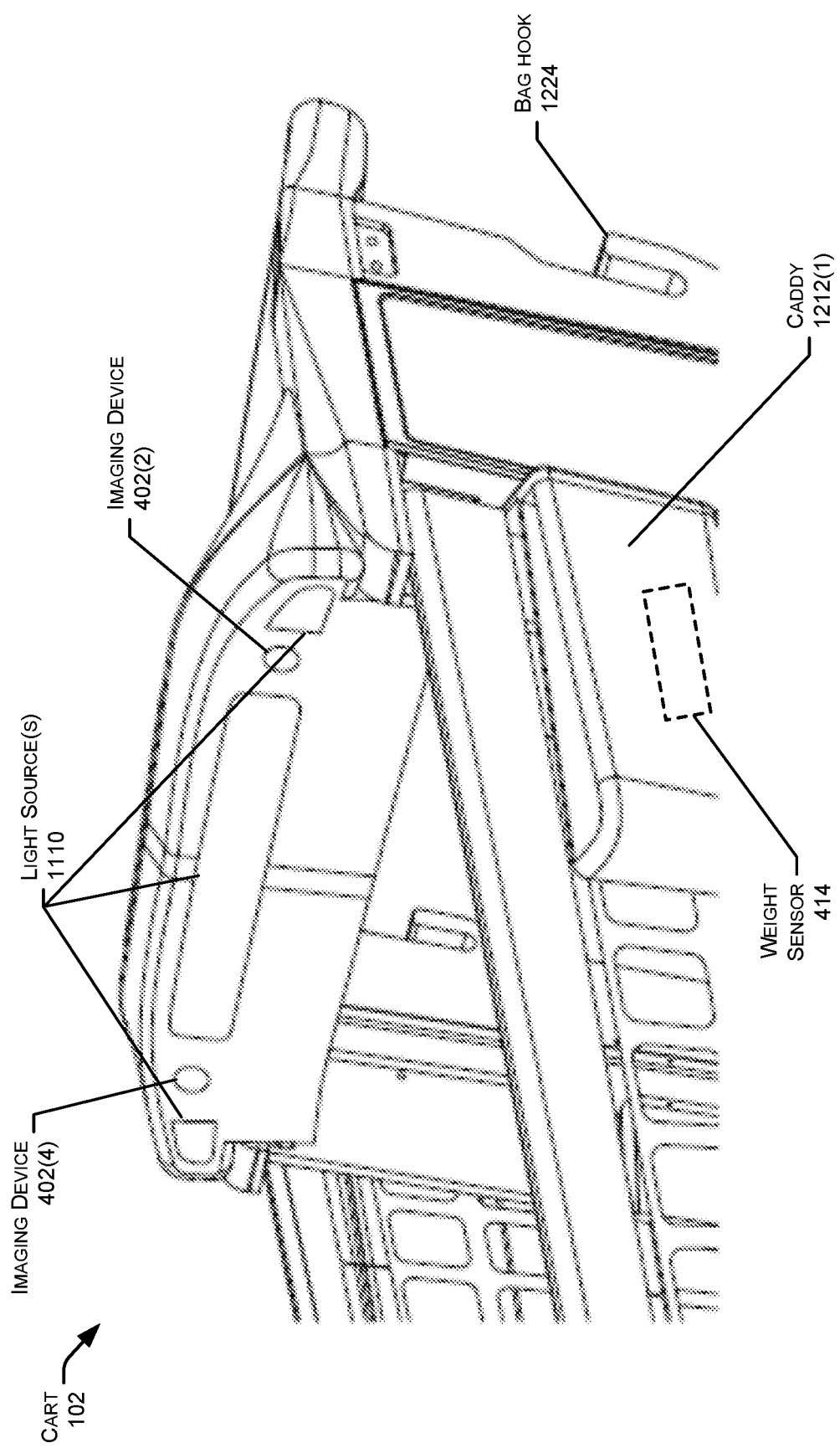
FIG. 12C illustrates yet another view of the example item-identifying cart of FIG. 12A. As illustrated, the cart may include one or more cameras for generating image data for identifying items placed into or removed from a basket of the cart. In addition, the cart may include one or more weight sensors for generating a current weight of the basket, which may be used to determine results of events involving the identified items.

FIG. 12C illustrates a closer view of one or more imaging devices 402(2) and 402(4) having an FOV substantially towards the basket of the cart. This figure also illustrates that the cart 102 may include one or more light sources 1110 between the imaging devices 402(2) and 402(4), to the left of the imaging device 402(3), and/or tot the right of the imaging device 402(2). In addition, FIG. 12C illustrates an example caddy 1212(1), which may define a receptacle for housing one or more items, as discussed above. Further, one or more weight sensors 414 may reside within or adjacent to the caddy 1212(1) for generating weight data indicating a weight or change in weight of the basket. Finally, this figure illustrates that the frame 1202 of the cart 102 may include one or more bag hooks 1224, comprising hooks in which a user operating the cart 102 may secure one or more bags. In some instances, the cart 102 may include a bag hook on a rear-left side of the frame (e.g., near a user operating the cart) and/or a bag hook on a rear-right side of the frame.

Figure 13A:
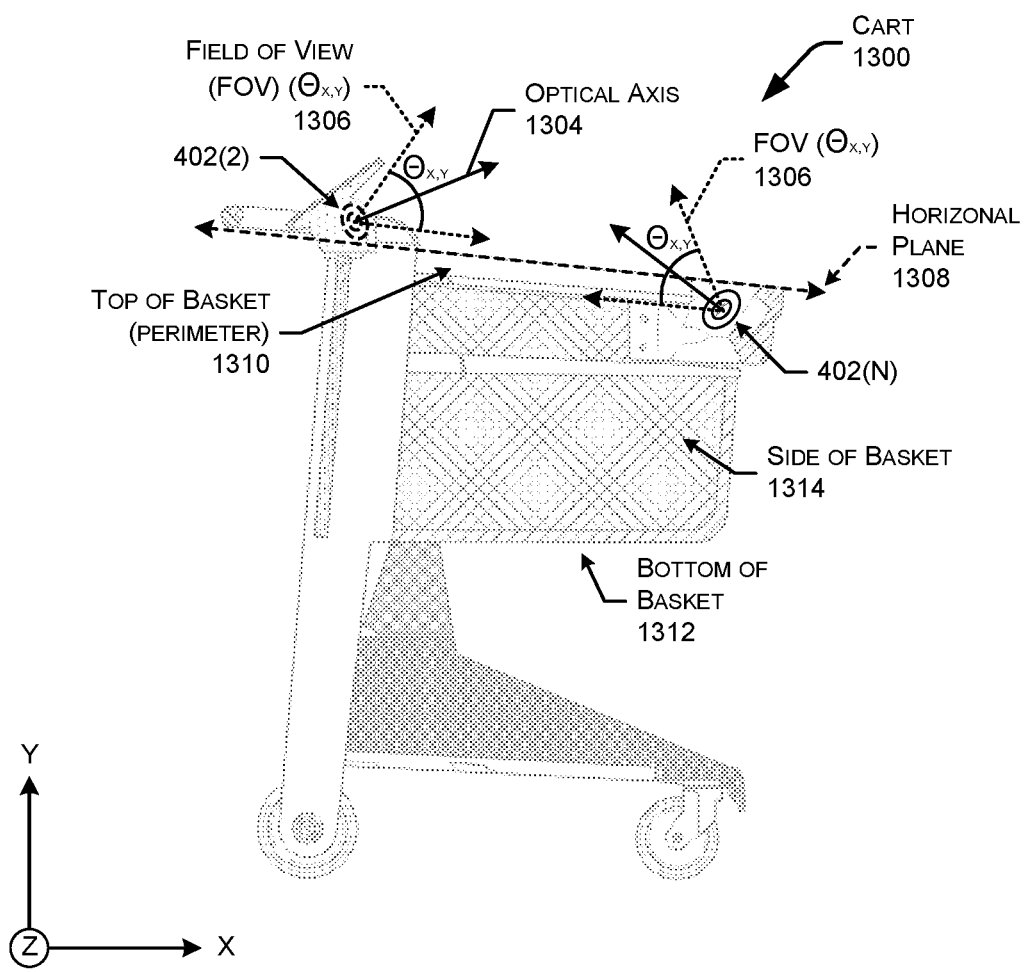
FIGS. 13A-D illustrate example views of an item-identifying cart that has one or more cameras for identifying items placed in the cart.

FIG. 13A illustrates an example cross-sectional view of an item-identifying cart 1300 that includes imaging device 402 for identifying items 104 placed in the cart 1300 and weight sensors for determining outcomes of events involving these identified items. While this cart 1300 may have a different form factors than other carts illustrated and described herein, characteristics of the cart 1300 may be applied to the other cart form factors, and vice versa. As illustrated, the cross-section of the cart 1300 is taken along a plane defined by the x-axis and y-axis along the center of the cart 1300 from the back to the front of the cart 1300.

In some examples, the imaging device 402(2) is positioned at a first corner of the basket 1204 near the back of the cart 1300. The imaging device 402(2) may have an optical axis 1304 and an FOV 1306 oriented along the x-y plane. The optical axis 1304 of the imaging device 402(12 may be directed upward from a substantially horizontal plane 1308 and towards the interior of the perimeter 1310 of the basket 1204. In some examples, the basket 1204 may include a bottom of the basket 1312, ones or more sides of the basket 1314 protruding up from the bottom 1312, and a top of the basket (perimeter) 1310 that is disposed along the substantially horizontal plane 1308. In some examples, the FOV 1306 of each of the second imaging devices may have a lower edge that is defined according to the horizontal plane 1308.

The first imaging device 402(2) may have an optical axis 1304 directed upward from the substantially horizontal plane 1308 and towards the interior of the perimeter 1310 of the basket 1204. In some examples, the FOV ($\theta_{x,y}$) 1306 may be defined according to the optical axis 1304 (e.g., the optical axis 1304 may be approximately the middle of the FOV 1306). The FOV 1306 may be any FOV for of the second imaging devices (e.g., 80 degrees, 70 degrees, 413 degrees, etc.). Generally, the FOV 1306 may at least partially include an area above the top of the basket. Similarly, another imaging device 402(4) coupled proximate to a corner of the basket 1204 on the front of the cart 1300. The imaging device 402(4) may have an optical axis 1304 directed upward from the substantially horizontal plane 1308 and towards the interior of the perimeter 1310 of the basket 1204. In some examples, the FOVs 1306 may include an area above the top 1310 of the cart 1300, an area within the basket 1204 of the cart, and/or a combination of above and below the top 1310 of the basket 1204.

Figure 13B:
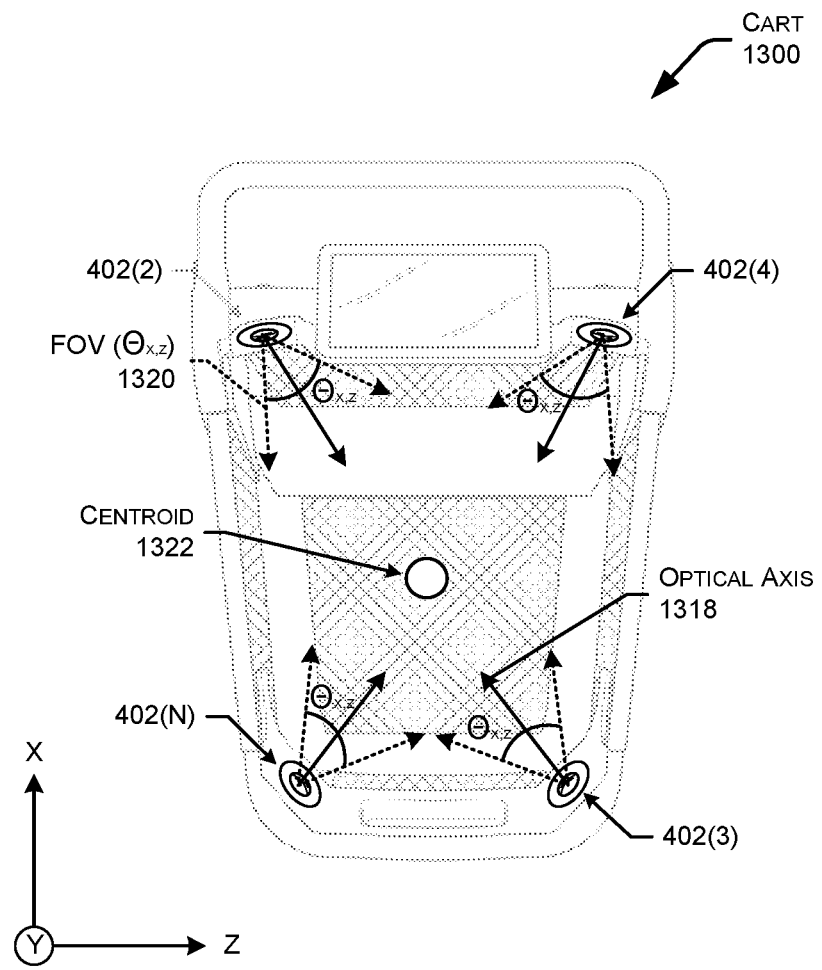

FIG. 13B illustrates an example top view of an item-identifying cart 1300 that has imaging devices 402(2)-(N) for identifying items 104 placed in the cart 1300. As illustrated, the cart 1300 is shown from a top view such that the dimensions of the cart 1300 are illustrated along an x-axis and a z-axis (x-z coordinate plane).

In some examples, four imaging devices 402 are positioned at four different corners of the frame 1202 and/or basket 1204 of the cart 1300. Each of the four imaging devices 402 may include respective optical axes 1318 directed inward relative to the perimeter 1310 of the basket 1204. Additionally, the four imaging devices 402(2)-(N) may each have FOVs ($\theta_{x,z}$) 1320 that are defined according to the optical axes 1318 (e.g., the optical axes 1318 may be approximately the middle of the FOVs 1320). The FOVs 1320 may be any FOV for cameras in the imaging devices (e.g., 80 degrees, 70 degrees, 413 degrees, etc.). Generally, the FOVs 1320 for each of imaging devices 402 may overlap at least partially at a centroid 1322 of the frame 1202 and/or basket 1204 of the cart 1300. The FOVs 1320 may, in combination, cover all, or most, of the interior of the perimeter 1310 of the basket 1204 such that items 104 are detected and identified using at least one of the imaging devices 402.

Figure 13C:
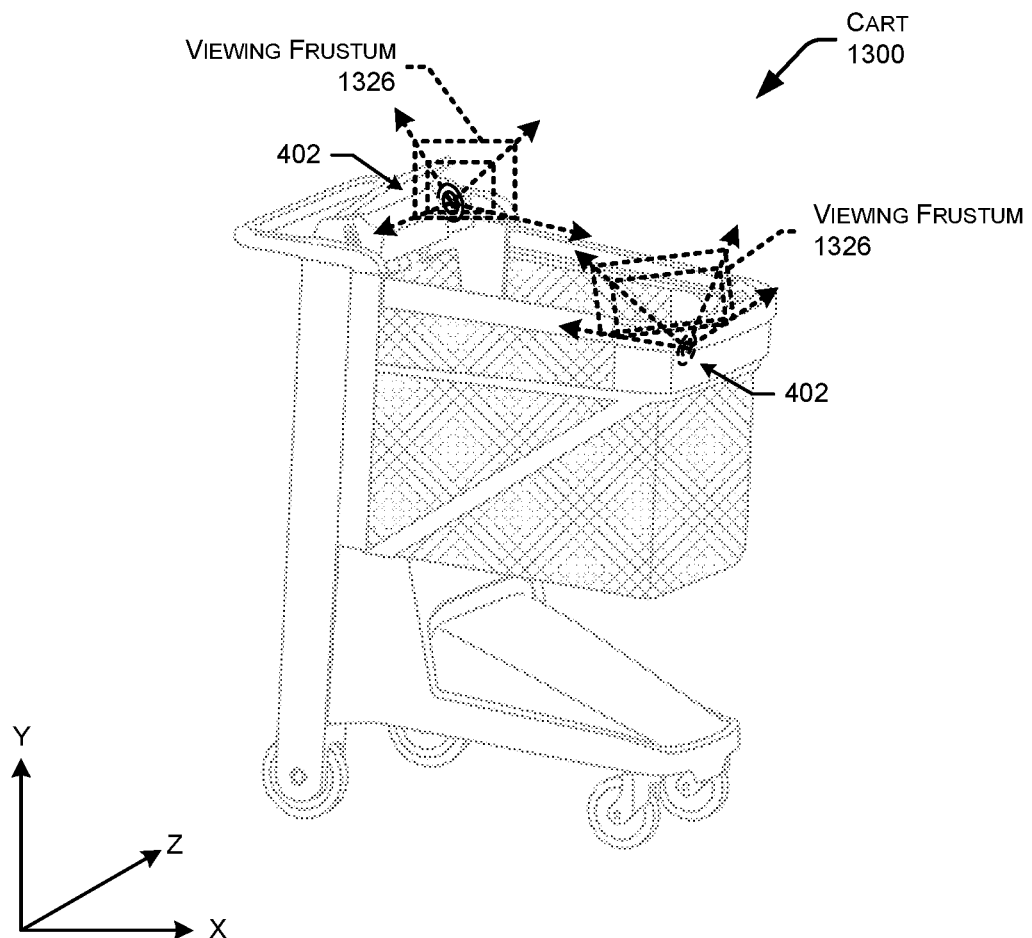

FIG. 13C illustrates an example perspective view of an item-identifying cart 1300 that has imaging devices 402 for identifying items 104 placed into the cart 1300. As illustrated, the cart 1300 may include multiple imaging devices that have viewing frustums 1326 that may be oriented in the same direction as the optical axis 1304. The viewing frustums 1326 may generally be the region of space in the environment of the cart 1300 that is within the field of view of the camera and/or proximity sensor of the imaging devices 402. The viewing frustums 1326 for each of the imaging devices 402 may be oriented inward to the basket 1204 of the cart, and upward relative to the top, or perimeter, of the basket 1310. The proximity sensor, if present, and imaging devices may have the same viewing frustum 1326, or different viewing frustum's 1326 that at least partially overlap.

Figure 13D:
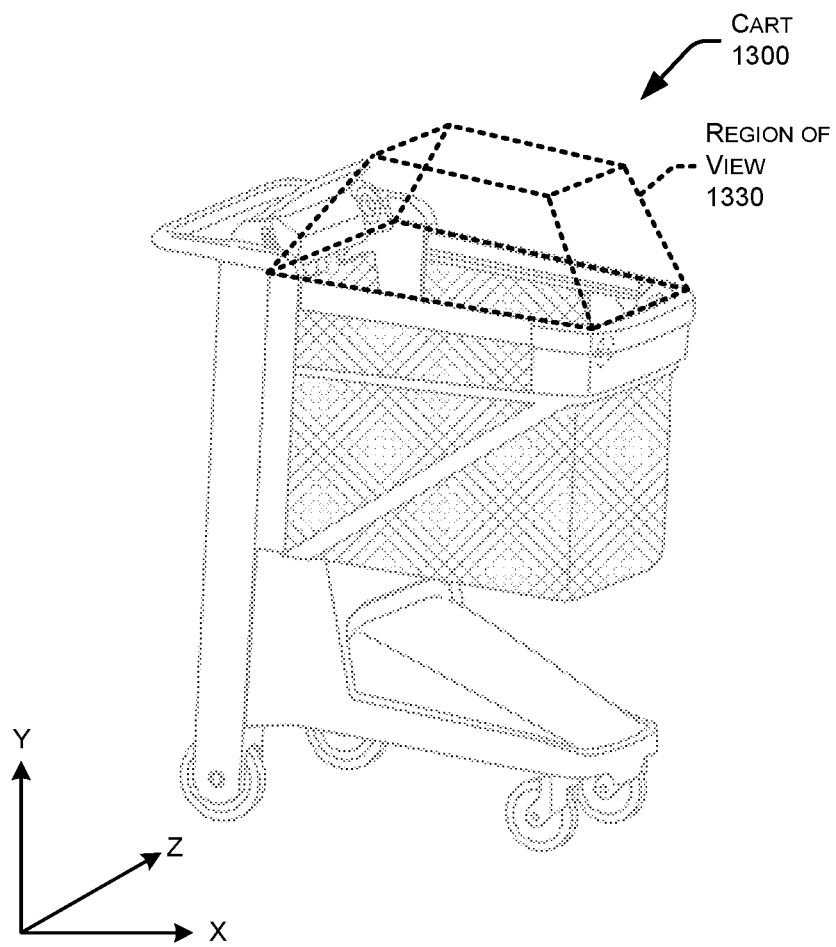

FIG. 13D illustrates another example perspective view of an item-identifying cart 1300 that has imaging devices 402 for identifying items 104 placed into the cart 1300. As shown in FIG. 13D, the viewing frustums 1326 and/or FOV's 1306 for each of the imaging devices 402 may generally define a region of view 1330. The region of view 1330 may comprise a volumetric, three-dimensional (3D) shape in which items 104 are captured in image data of the cameras, and/or detected by proximity sensors. Thus, the region of view 1330 defines a volumetric region in which at least one of the cameras is able to capture image data representing an item 104. Generally, the region of view 1330 may encompass substantially all, or a large majority of, the perimeter of the top of the basket 1310. In this way, items 104 placed in the basket 1204 will be detected and have image data generated that represents the items 104 as they are being placed in the basket 1204. Although illustrated as including space above the basket 1204, in some examples, the region of view 1330 may additionally, or alternatively, include space inside the basket 1204 (e.g., downward facing cameras). In some instances, the region of view 1330 defined by the cameras on the cart 102 may be the same as the region of view 1330 of the proximity sensors, or different than the region of view 1330 of the proximity sensors.

Figure 14:
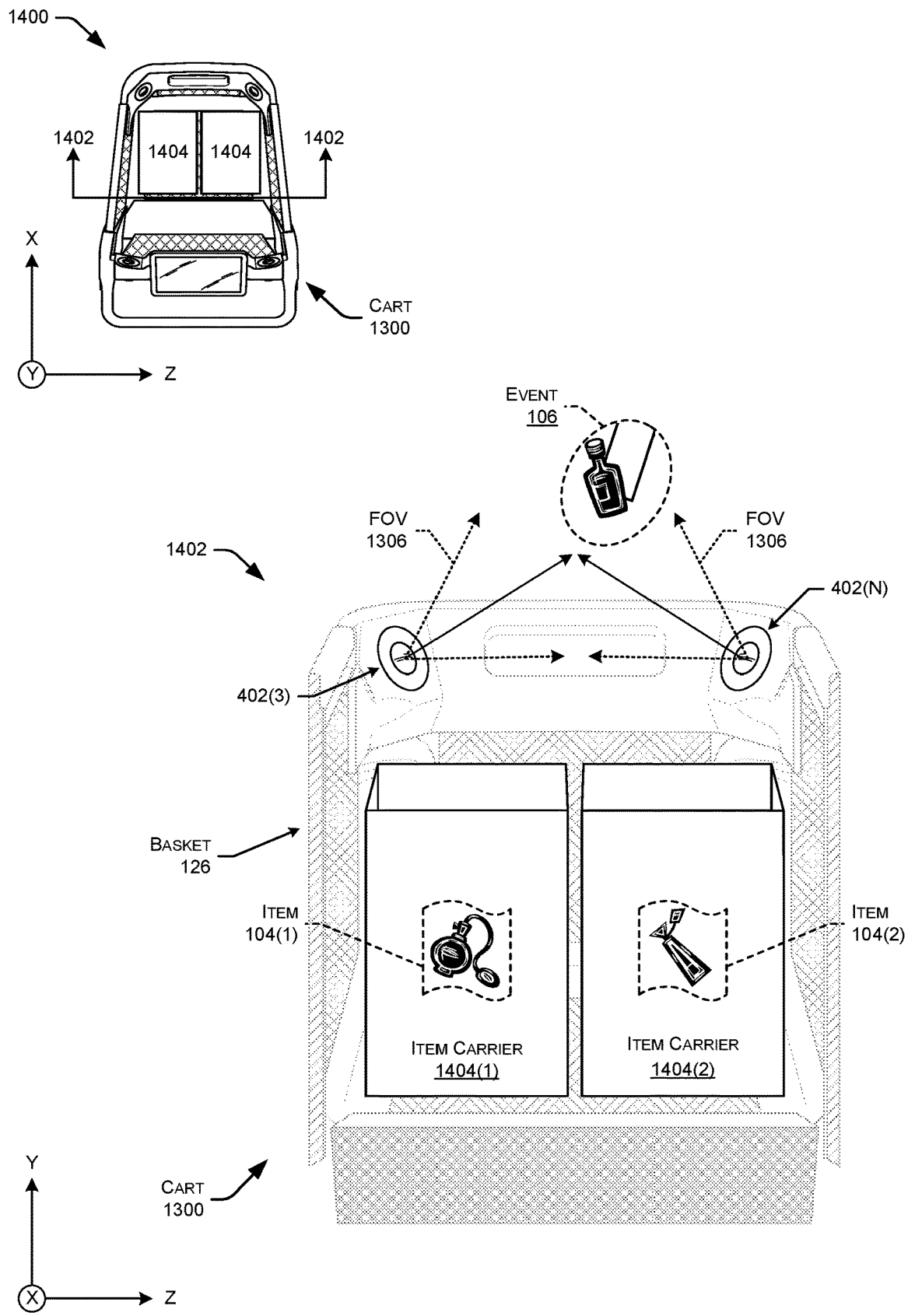
FIG. 14 illustrates another example cross-sectional view of an item-identifying cart that has item carriers placed inside the basket of the cart, and cameras that are used to identify an item being placed in the item carriers.

FIG. 14 illustrates another example of an item-identifying cart 1300, including a top view 1400 and a cross sectional view 1402, that has item carriers 1404 placed inside the basket of the cart 1300, and imaging devices 402 and light sources 1110 that are used to identify an item being placed in the item carriers 1404.

As illustrated by the top view 1400, the cart 1300 may include a basket that is sized to store one or more item carriers 1404, such as bags (e.g., plastic bags, paper bags, etc.), boxes, user-provided item carrier, and/or any other item carrier 1404. In some examples, the cart 1300 may have a basket 1204 that is sized to efficiently fit (e.g., minimize empty space in the basket 1204) one or more of the item carriers 1404. As shown in the cross-sectional view 1402 of the basket 1204 of the cart, the item carriers 1404 may be sized such that the tops of the item carriers 1404(1) and 1404(2) are below the perimeter defining the top of the basket 1204. In this way, the FOVs of the imaging devices 402 are not obstructed by the item carriers 1404.

As shown, the item carriers 1404 may have items 104 stored therein, which are no longer visible to cameras due to their placement in the item carriers 1404. Accordingly, if the imaging devices 402 had FOVs 1306 that generated image data of the interior of the basket 1204, the items 104 may not be visible due to occlusion from the item carriers 1404. However, to identify the items 104 placed in a cart 1300, the imaging devices 402 need to be able to view the items 104, which would prevent users from being able to place item carriers 1404 in their carts 102. Thus, by having FOVs 1306 that at least partly face upward relative to the top of the perimeter of the basket 1204, the items 104 that are placed in the basket are identifiable in image data generated by the imaging devices 402. Additionally, users are able to place their item carriers 1404 directly in the basket 1204 to receive items 104 as the user shops, thereby reducing friction in the traditional-checkout experience by having to take items out of the cart 1300 to be bagged or otherwise placed in item carriers 1404.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

What is claimed is:

1. A mobile apparatus comprising:
   a basket to receive an item;
   one or more cameras configured to generate image data representing the item being placed into the basket;
   one or more processors;
   volatile memory;
   non-volatile memory;
   an item-localization component, stored in the non-volatile memory and executable on the one or more processors to perform operations comprising:
      analyzing, using a trained localizer, a first frame of the image data to identify a portion of the first frame representing the item;
      determining that the portion of the first frame satisfies one or more predefined criteria; and
      storing, in the volatile memory, at least the portion of the first frame in association with a timestamp of the first frame;
   an event-determination component, stored in the non-volatile memory and executable on the one or more processors to perform operations comprising:
      analyzing the image data;
      determining, based at least in part on the analyzing, that the item has not been identified; and
      generating an indication that the item has not been identified;
   a user-interface component, stored in the non-volatile memory and executable on the one or more processors to perform operations comprising:
      receiving the indication that the item has not been identified;
      determining a time range associated with the item not being identified, wherein a time associated with the timestamp of the first frame is within the time range; and
      generating a user interface (UI) that includes the first portion of the first frame based at least in part on the time associated with the timestamp of the first frame being within the time range.

2. The mobile apparatus of claim 1, wherein the item-localization component is executable on the one or more processors to determine that the portion of the first frame satisfies the one or more predefined criteria based at least in part by determining that a confidence level associated with the portion of the first frame is greater than a threshold confidence value.

3. The mobile apparatus of claim 1, wherein the item-localization component is executable on the one or more processors to determine that the portion of the first frame satisfies the one or more predefined criteria based at least in part by determining that a size of the portion of the first frame is less than a threshold size.

4. The mobile apparatus of claim 1, wherein the item-localization component is executable on the one or more processors to determine that the portion of the first frame satisfies the one or more predefined criteria based at least in part by determining that a threshold amount of time has passed since last storing a frame of the image data in the volatile memory.

5. The mobile apparatus of claim 1, wherein the user-interface component is further executable on the one or more processors to perform operations comprising:
   determining that the first portion of the first frame is associated with a highest confidence level of frames stored in the memory and associated with a timestamp that occurs within the time range; and
   selecting the first portion of the first frame at least partly in response to the determining that the first portion of the first frame is associated with the highest confidence level.

6. A method comprising:
   receiving, from one or more cameras associated with an apparatus, image data representing an item being placed into or removed from the apparatus;
   analyzing a first frame of the image data to determine a portion of the first frame that includes an item and a confidence level associated with the portion of the first frame including the item, the first frame associated with a first time;
   determining that that the confidence level is greater than a threshold confidence level;
   determining that a size of the portion of the first frame is less than a threshold size;
   determining that a threshold amount of time has elapsed since storing a frame in memory; and
   storing, in the memory, at least the portion of the first frame in association with a timestamp indicating the first time.

7. The method as recited in claim 6, wherein the receiving comprises receiving, from one or more cameras mounted to a basket of a cart, the image data representing the item being placed into or removed from the basket of the cart.

8. The method as recited in claim 6, wherein the storing comprises storing, in the memory video data that includes: (i) the at least the portion of the first frame, (ii) at least a portion of a second frame of the image data, the second frame occurring prior to the first frame, and (iii) at least a portion of a third frame of the image data, the third frame occurring after the first frame.

9. The method as recited in claim 6, further comprising:
   analyzing at least a portion of the image data to determine an item identifier associated with the item;
   determining that the item identifier has not been determined; and
   retrieving, from the memory, the at least the portion of the first frame at least partly in response to determining that the item identifier has not been determined.

10. The method as recited in claim 9, further comprising:
    generating a user interface (UI) that includes the at least the least the portion of the first frame and that includes an indication that the item identifier associated with the item placed into or removed from the apparatus has not been determined; and presenting the UI on a display associated with the apparatus.

11. The method as recited in claim 10, wherein the generating the UI comprises generating the UI that includes: (i) the at least the least the portion of the first frame, (ii) the indication that the item identifier associated with the item placed into or removed from the apparatus has not been determined, and (iii) one or more instructions for enabling the apparatus to determine the item identifier.

12. The method as recited in claim 9, further comprising:
determining a time range associated with an event involving the item; and
determining that the at least the portion of the first frame is associated with a highest confidence level of respective confidence levels of frames stored in the memory and associated with respective timestamps representing times that occur within the time range;
and wherein the retrieving comprising retrieving the at least the portion of the first frame at least partly in response to the determining that the at least the portion of the first frame is associated with the highest confidence level of respective confidence levels of frames stored in the memory and associated with respective timestamps representing times that occur within the time range.

13. The method as recited in claim 9, wherein the item comprises a first item, and further comprising:
determining a time range associated with a first event involving the first item;
determining that a second event associated with a second item has been resolved, the second event associated with a second time that occurs within the time range;
biasing downwards a confidence level associated with at least a portion of a second frame of the image data associated with a third time, the third time being within a threshold amount of time of the second time; and
determining, after the biasing, that the at least the portion of the first frame is associated with a highest confidence level of respective confidence levels of frames stored in the memory and associated with respective timestamps representing times that occur within the time range;
and wherein the retrieving comprising retrieving the at least the portion of the first frame at least partly in response to the determining that the at least the portion of the first frame is associated with the highest confidence level of respective confidence levels of frames stored in the memory and associated with respective timestamps representing times that occur within the time range.

14. A system comprising:
memory;
one or more processors; and
one or more computer-readable media storing computer-executable instructions that, when executed, cause the one or more processors to perform operations comprising:
receiving, from one or more cameras associated with an apparatus, image data representing an item being placed into or removed from the apparatus;
analyzing a first frame of the image data to determine a portion of the first frame that includes an item and a confidence level associated with the portion of the first frame including the item, the first frame associated with a first time;
determining that that the confidence level is greater than a threshold confidence level;
determining that a size of the portion of the first frame is less than a threshold size;
determining that a threshold amount of time has elapsed since storing a frame in memory; and
storing, in the memory, at least the portion of the first frame in association with a timestamp indicating the first time.

15. The system as recited in claim 14, further comprising:
a basket; and
one or more cameras mounted to the basket;
and wherein the receiving comprises receiving, from the one or more cameras mounted to a basket, the image data representing the item being placed into or removed from the basket.

16. The system as recited in claim 14, wherein the computer-readable media further stores computer-executable instructions that, when executed, cause the one or more processors to perform operations comprising:
analyzing at least a portion of the image data to determine an item identifier associated with the item;
determining that the item identifier has not been determined; and
retrieving, from the memory, the at least the portion of the first frame at least partly in response to determining that the item identifier has not been determined.

17. The system as recited in claim 16, wherein the computer-readable media further stores computer-executable instructions that, when executed, cause the one or more processors to perform operations comprising:
generating a user interface (UI) that includes the at least the least the portion of the first frame and that includes an indication that the item identifier associated with the item placed into or removed from the apparatus has not been determined; and
presenting the UI on a display associated with the apparatus.

18. The system as recited in claim 17, wherein the generating the UI comprises generating the UI that includes: (i) the at least the least the portion of the first frame, (ii) the indication that the item identifier associated with the item placed into or removed from the apparatus has not been determined, and (iii) one or more instructions for enabling the apparatus to determine the item identifier.

19. The system as recited in claim 14, wherein the computer-readable media further stores computer-executable instructions that, when executed, cause the one or more processors to perform operations comprising:
determining a time range associated with an event involving the item; and
determining that the at least the portion of the first frame is associated with a highest confidence level of respective confidence levels of frames stored in the memory and associated with respective timestamps representing times that occur within the time range;
and wherein the retrieving comprising retrieving the at least the portion of the first frame at least partly in response to the determining that the at least the portion of the first frame is associated with the highest confidence level of respective confidence levels of frames stored in the memory and associated with respective timestamps representing times that occur within the time range.

20. The system as recited in claim 14, wherein the item comprises a first item and the computer-readable media further stores computer-executable instructions that, when executed, cause the one or more processors to perform operations comprising:
- determining a time range associated with a first event involving the first item;
- determining that a second event associated with a second item has been resolved, the second event associated with a second time that occurs within the time range;
- biasing downwards a confidence level associated with at least a portion of a second frame of the image data associated with a third time, the third time being within a threshold amount of time of the second time; and
- determining, after the biasing, that the at least the portion of the first frame is associated with a highest confidence level of respective confidence levels of frames stored in the memory and associated with respective timestamps representing times that occur within the time range; and
- wherein the retrieving comprising retrieving the at least the portion of the first frame at least partly in response to the determining that the at least the portion of the first frame is associated with the highest confidence level of respective confidence levels of frames stored in the memory and associated with respective timestamps representing times that occur within the time range.

* * * * *